US011335153B1

(12) United States Patent
Finley et al.

(10) Patent No.: US 11,335,153 B1
(45) Date of Patent: May 17, 2022

(54) FULLY AUTONOMOUS SYSTEM AND METHOD FOR GRADING, STAMPING AND ENCAPSULATING A COLLECTIBLE OBJECT

(71) Applicant: FINMO CARD CO., LLC, Benton, AR (US)

(72) Inventors: Tony Scott Finley, Searcy, AR (US); Corbin Trent Finley, Tulsa, OK (US); Matthew Miguel Hernandez, Benton, AR (US); Byron Ibzam Carranza Montero, Benton, AR (US); Andrew Burrow, College Station, TX (US); Tyler Finley, Searcy, AR (US); Connor Hinson, Brentwood, TN (US); Aaron Moulton, Benton, AR (US)

(73) Assignee: FINMO CARD CO., LLC, Benton, AR (US)

( * ) Notice: Subject to any disclaimer, the term of this patent is extended or adjusted under 35 U.S.C. 154(b) by 0 days.

(21) Appl. No.: 17/369,949

(22) Filed: Jul. 7, 2021

(51) Int. Cl.
| | |
|---|---|
| *G06K 9/00* | (2006.01) |
| *G06T 7/00* | (2017.01) |
| *G07D 7/20* | (2016.01) |
| *G06F 16/51* | (2019.01) |
| *G06N 3/04* | (2006.01) |
| *G06K 7/14* | (2006.01) |

(52) U.S. Cl.
CPC ........... *G07D 7/2083* (2013.01); *G06F 16/51* (2019.01); *G06N 3/0454* (2013.01); *G06K 7/1417* (2013.01); *G06T 7/0002* (2013.01); *G06T 2207/20084* (2013.01)

(58) Field of Classification Search
CPC ..... G07D 7/2083; G06F 16/51; G06F 3/0484; G06F 16/24578; G06N 3/0454; G06K 7/1417; G06K 9/3233; G06T 7/0002; G06T 2207/20084; G06T 5/001; G06T 7/001

See application file for complete search history.

(56) References Cited

U.S. PATENT DOCUMENTS

| | | | | |
|---|---|---|---|---|
| 9,767,163 | B2 * | 9/2017 | Kass | ....................... G06T 7/001 |
| 10,146,841 | B2 * | 12/2018 | Kass | ....................... G06T 7/001 |
| 10,445,330 | B2 * | 10/2019 | Kass | ....................... G06T 7/001 |
| 10,459,931 | B2 * | 10/2019 | Kass | ....................... G07D 7/20 |

(Continued)

*Primary Examiner* — Samir A Ahmed
(74) *Attorney, Agent, or Firm* — Dave Law Group LLC; Raj S. Dave

(57) ABSTRACT

Embodiments relate to a system, comprising, an electromechanical platform for positioning and orienting a collectible to capture a plurality of images by an image capturing device of at least a first side and a second side of the collectible, a computer comprising at least one processor comprising computer-executable instructions stored on one or more computer-readable media, wherein the computer is operable to receive the plurality of images of the collectible, at least one processing routine comprising an image processing algorithm for a condition assessment of the collectible applied to at least one image from the plurality of images by at least one processor to obtain a raw data of the condition of the collectible, a device for encapsulating the collectible in a tamper proof casing and stamping at least one or more labels on the tamper proof casing, wherein the stamping of the at least one or more labels is at a specified location on the tamper proof casing; and wherein the system is operable to be fully autonomous.

18 Claims, 33 Drawing Sheets

(56) References Cited

U.S. PATENT DOCUMENTS

| | | | |
|---|---|---|---|
| 2007/0187266 A1* | 8/2007 | Porter | G06Q 10/087 206/232 |
| 2009/0284754 A1* | 11/2009 | Haddock | G01B 11/06 356/601 |
| 2010/0039818 A1* | 2/2010 | Haddock | A47G 1/12 362/253 |
| 2016/0210734 A1* | 7/2016 | Kass | G06F 16/24578 |
| 2017/0132866 A1* | 5/2017 | Kuklinski | G07D 7/2083 |
| 2018/0246895 A1* | 8/2018 | Kass | G06T 7/001 |
| 2019/0114762 A1* | 4/2019 | Liberatori, Jr. | G06T 7/0002 |

* cited by examiner

RECTIFIER – MCCGBJ1502

| Control Value | Runs | | | | | | | | | |
|---|---|---|---|---|---|---|---|---|---|---|
| | 1 | 2 | 3 | 4 | 5 | 6 | 7 | 8 | 9 | 10 |
| 9 | 9 | 9 | 9.5 | 9 | 9 | 9 | 9 | 9 | 9.5 | 9 |

| Control Value | Runs | | | | | | | | | |
|---|---|---|---|---|---|---|---|---|---|---|
| | 1 | 2 | 3 | 4 | 5 | 6 | 7 | 8 | 9 | 10 |
| 4 | 3.5 | 3.5 | 4 | 4 | 4 | 4 | 3.5 | 3.5 | 4 | 4 |

| Control Value | Runs | | | | | | | | | |
|---|---|---|---|---|---|---|---|---|---|---|
| | 1 | 2 | 3 | 4 | 5 | 6 | 7 | 8 | 9 | 10 |
| 7.5 | 8 | 8 | 8 | 7.5 | 8 | 8 | 7.5 | 8 | 8 | 8 |

| Control Value | Runs | | | | | | | | | |
|---|---|---|---|---|---|---|---|---|---|---|
| | 1 | 2 | 3 | 4 | 5 | 6 | 7 | 8 | 9 | 10 |
| 9.5 | 9.5 | 9.5 | 9.5 | 10 | 10 | 9.5 | 9.5 | 9.5 | 9.5 | 9.5 |

| Control Value | Runs | | | | | | | | | |
|---|---|---|---|---|---|---|---|---|---|---|
| | 1 | 2 | 3 | 4 | 5 | 6 | 7 | 8 | 9 | 10 |
| 3 | 3 | 3.5 | 3.5 | 3.5 | 3.5 | 3.5 | 3 | 3 | 3.5 | 3.5 |

*The SmartEye 2.0*
Annotated Report

Date: XX.XX.XX Time: XX.XX hrs
Machine ID: XXXX
Location: XXXXXX

Grade: 9.5
Card Name: *Kemba Walker, 2019*
Card Order Number: ABX255HGD3456
Serial Number (if applicable): 4569836
Card Rarity: 1 of 2367

Centering: 8.5
*Left/Right: 45/55*
*Top/Bottom: 60/40*

Corners: 9.5
*There has been a detection that (1) corner is unsharp.*
*There has been a detection that (1) corner(s) is defective.*

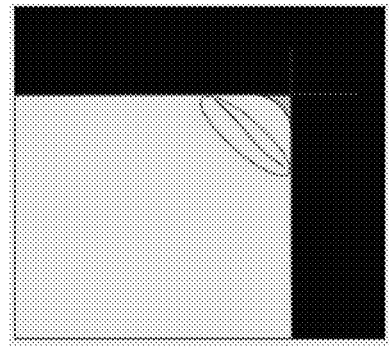

Edges: 9
*There has been a detection that (1) corner(s) is defective.*
*There has been a detection that (3) edge(s) is defective.*

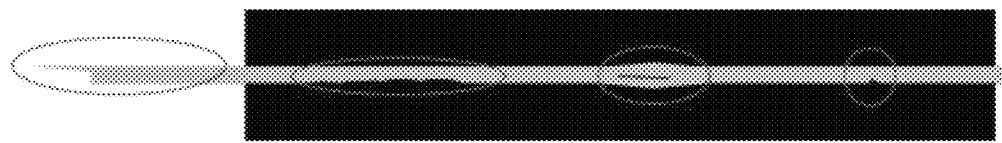

Surface Defects Detected: 8.5
*Discoloration detected*
*Scratch detected*
*Indented Face detected*
*Bent Corner detected*
*Edge Alteration detected*

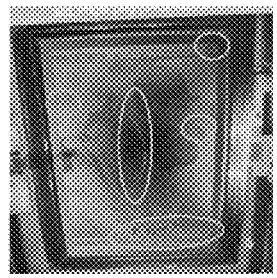

Total Score: 9.5

FIG. 38

FULLY AUTONOMOUS SYSTEM AND METHOD FOR GRADING, STAMPING AND ENCAPSULATING A COLLECTIBLE OBJECT

FIELD OF THE INVENTION

This invention generally relates to a system and method for grading, stamping and encapsulating a collectible object. The invention is more particularly concerned with a fully autonomous computerized system and method for grading, stamping and encapsulating a collectible object such as sport and non-sport card collectibles and other printed objects including event ticket, programs, photographs, and the like followed by stamping and encapsulating the collectible in a tamper proof case.

BACKGROUND

"Card collecting, including sport and non-sport cards, has become, for many fans, much more than a hobby. There is a great deal of potential value in building a card collection and it could take years of research, time, and work. When a collector is interested in building a valuable card collection, it is very important for the collector to know that the condition of the card significantly affects it's the value as a collectible. As such, it is very common for cards, as well as other collectible objects, to be professionally evaluated by industry recognized experts and graded in an effort to determine the value of a particular card or object. A professionally graded card is inspected for authenticity and rated on various criteria, for its condition. The card is then assigned an overall grade, generally from 1-10, sealed in a tamper-proof holder (slab) and assigned a certification number that is maintained by the grading company. A graded card can increase the value of the card in comparison to an ungraded card of equal or similar condition by means of offering the card owner or buyer an assurance of the card's authenticity and condition." [U.S. patent Ser. No. 10/459,931B2]

"Grading of cards is based on various characteristics that pertain to the "general eye appeal" of the card. Characteristics of the card that are universally examined in the grading process are centering, corners, edges, and surface. Centering is the placement of the image (top to bottom and left to right) on the card relative to the card borders. Industry standards exist for percentage of off centering variance permitted for each of the possible card grades. The corners of the card are inspected to determine the quality of the physical condition of the corner and/or if any defect of the corners is present. The edges of the card are examined, similarly as the corners, to determine the quality of the physical condition of the edges of the card, and account for any damages and/or imperfections along the edges. The surface of the card is examined to account for any damage and/or imperfections on the card, such as scratches, creases, tears, pinholes, stains, dents, attempts at recoloring, etc." [U.S. patent Ser. No. 10/459,931B2]

"Today there are three industry accepted grading companies that represent approximately 99% of the market. Each of the grading companies grade cards by human evaluation, primarily with the naked eye and typically devote approximately one minute per card during the grading process. Because this grading process can be highly subjective, it results in cards rarely receiving the same grade when graded by any of the three industry leaders, or the same grade when re-graded with the same grading company that previously graded the card. As such, there is no grading methodology available in the marketplace today that provides accurate and consistent results in cards as well as other collectibles, e.g., coins, stamps, etc." [U.S. patent Ser. No. 10/459,931B2]

"Grading is, with extremely rare exception, the most significant determination of value, such fluctuations in grading often result in misstatement of value and lack of confidence in the marketplace necessary to sustain a stable and efficient market. All of the grading companies solicit resubmission of any previously graded card in its original holder (slab) by other companies or even graded by themselves for the possibility of a higher grade." [U.S. patent Ser. No. 10/459,931B2]

"Awareness in the marketplace of the possibilities for resubmitted cards receiving higher grades has resulted in card owners breaking open the "tamper proof" holders and resubmitting the cards multiple times, if necessary, without disclosing that the card has been previously graded." [U.S. patent Ser. No. 10/459,931B2]

"Other factors impacting the current coin grading system include, but are not limited to, "grade inflation", re-grading for increased value, bias of a specific grader, and like. Ideally, an objective and impartial system would be preferred for assigning a proper grade to a coin, particularly in the case of slabbed rare coins." [U.S. Publication Number 20190114762A1]

Considering the knowledge of the persons skilled in the art, there is a need for fully autonomous grading system by applying modern visual technology and computer processing capabilities along with full automation of the process where there is no human interaction or interference to the process in order to overcome the cons of traditional grading system that exists today which is by hand and by eye, which is unfair, inconsistent, subjective, and has high labor content.

SUMMARY

According to an embodiment, it is a system, comprising an electromechanical platform for positioning and orienting a collectible to capture a plurality of images by an image capturing device of at least a first side and a second side of the collectible, a computer comprising at least one processor, wherein the computer is operable to receive the plurality of images of the collectible, at least one processing routine comprising an image processing algorithm for a condition assessment of the collectible applied to at least one image from the plurality of images by at least one processor to obtain a raw data of the condition of the collectible, a device for encapsulating the collectible in a tamper proof casing and stamping at least one or more labels on the tamper proof casing, wherein the stamping of the at least one or more labels is at a specified location on the tamper proof casing, and wherein the system is operable to be fully autonomous.

According to an embodiment, the collectible is at least one or more sport trading cards.

According to an embodiment, the collectible is at least one or more non-sport trading cards.

According to an embodiment, the electromechanical platform is configured to have at least one degree of rotational freedom to position and orient the collectible relative to the image capturing device.

According to an embodiment, the electromechanical platform is further configured to have at least one degree of translational freedom to position and orient the collectible relative to the image capturing device.

According to an embodiment, the system further comprises a tracking system capable of tracking a position of the electromechanical platform relative to the image capturing device.

According to an embodiment, the tracking system can track a tilt angle of the electromechanical platform relative to the image capturing device.

According to an embodiment, the electromechanical platform comprises a plurality of sensory units attached to the electromechanical platform, a plurality of motor drives attached to a member of the electromechanical platform and a motion capture sensor.

According to an embodiment, the tracking system comprises a camera, a laser range finder, a first plurality of optical targets attached to the collectible, a second plurality of optical targets attached to the electromechanical platform, and a local positioning system processor.

According to an embodiment, the electromechanical platform further comprises a plurality of motors rotatably coupled to the electromechanical platforms for omnidirectional motion.

According to an embodiment, the electromechanical platform further comprises an extendible member pivotally mounted to the electromechanical platform.

According to an embodiment, the system will receive a signal operable to indicate that the electromechanical platform is loaded with the collectible.

According to an embodiment, the system is operable, under control of the processor, to send a further task that can replace a current task.

According to an embodiment, the image processing algorithm for the condition assessment of the collectible is a machine learning algorithm aided by artificial intelligence, wherein the machine learning algorithm is operable to identify at least one physical feature of the collectible at least in part by providing a composite image as an input to a multi-layer neural network using deep learning technique.

According to an embodiment, the machine learning algorithm of the system is trained using images of trading cards exhibiting examples of different classes of defects including surface defects.

According to an embodiment, the collectible is picked from a stack of collectibles that are preloaded or the collectible can be received through one of a multiple isolated platforms where the collectible can be handled individually and is transported automatically to a grading area for grading the collectible.

According to an embodiment, the electromechanical platform comprises an adaptive casing.

According to an embodiment, the adaptive casing is equipped with sensors to facilitate alignment of the collectible parallel to a horizontal plane.

According to an embodiment, the first side is a top surface of the collectible, and the second side is a bottom surface of the collectible.

According to an embodiment, the adaptive casing is in an open position when an image capturing device captures at least a first set of images of the first side of the collectible.

According to an embodiment, the adaptive casing rotates about an axis of the collectible to 180 degrees and is in open position when an image capturing device captures at least a second set of images of the second side of the collectible.

According to an embodiment, the condition assessment of the collectible is based on collecting metrics for centering, corners, edges from an image of the collectible and identifying a possible area on surface of the collectible where a physical damage may be present, wherein the physical damage comprises an analysis for bends, tears, stains, scratches, discolorations, cuts, color fading, alterations, re-coloring, bleaching of image and/or card, chips, dents, added color to fill in areas of defect, printing errors, effects of bleaching, stain removal, addition of material or other material and image removal for a purpose of altering a width of borders of the collectible to re-center the collectible.

According to an embodiment, the raw data of the condition is used towards computing a grade for the collectible to a grade scale.

According to an embodiment, the grade computed from the raw data of the condition is further adjusted with overall grade adjustment rules which are autonomously obtained by algorithms from planned and known cases.

According to an embodiment, the raw data of the condition is used towards generating a detailed annotated report comprising a detailed image report and relevant information used in determining a grade of the collectible.

According to an embodiment, the raw data of the condition of the collectible is provided to a professional grader to arrive at a final grade.

According to an embodiment, a grade scale can be any predefined scale including a 1000-point scale or a 10-point scale with a grade scale tolerance.

According to an embodiment, the grade scale tolerance can be in a range of 0.01% to 10% and can be varied within the grade scale.

According to an embodiment, the tamper proof casing is a transparent case.

According to an embodiment, the encapsulating of the collectible in the tamper proof casing is by sonic welding by a hydraulic or a pneumatic press.

According to an embodiment, the at least one or more labels comprises a unique identification number including serial number, Quick Response code, and barcode.

According to an embodiment, the raw data of the condition of the collectible is stored in a database either locally or on a cloud.

According to an embodiment, information to be included on the at least one or more labels is customizable.

According to an embodiment, a user can review and interact to further investigate the captured images to manually inspect and review the collectible through an interactive display of the system.

According to an embodiment, the system is portable and hence easily moveable.

According to an embodiment, it is a method comprising, positioning and orienting a collectible to get a plurality of views of the collectible for capturing an image by an image capturing device, wherein orienting the collectible is fully automated, capturing a plurality of images of the collectible, generating a raw data of the condition of the collectible from an image processing algorithm processing at least one image from the plurality of images, and wherein, the method is for collecting the raw data of the condition of the collectible.

According to an embodiment, the image processing algorithm for a condition assessment of the collectible is a machine learning algorithm, wherein the machine learning algorithm is aided by artificial intelligence and is operable to identify at least one physical feature of the collectible at least in part by providing a composite image as an input to a multi-layer neural network using deep learning technique.

According to an embodiment, it is a method, comprising, receiving a collectible, wherein the collectable is a trading card, grading the collectible, wherein the grading of the collectible is fully autonomous and further comprises, inserting the collectible into an adaptive casing of a grading device, capturing a plurality of images of at least a first side and a second side of the collectible, processing the plurality of images for defects, computing a grade to the collectible corresponding to a user set grade scale, assigning the grade to the collectible and acquiring a data of the collectible, printing or stamping at least one or more labels on a tamper proof casing, wherein the printing or stamping of the at least one or more labels is at a specified designation on the tamper proof casing, encapsulating the collectible in the tamper proof casing, associating the at least one or more labels with the data of the collectible, saving the data to a database, moving the collectible to an extraction area and wherein the method is operable for autonomous collectible grading, stamping and encapsulating.

According to an embodiment, a data of the collectible comprises name of a player or character on the face of the card, grade, company name, detailed annotated report, place of review, condition feedback, recording, possible background checking, and digital review, and is stored either locally or on a cloud.

According to an embodiment, it is a system, comprising, a device for grading a collectible, encapsulating the collectible in a tamper proof casing, and printing or stamping at least a label at a designated section of the tamper proof casing, a computer system comprising at least one processor for executing a method on the device, wherein the method, comprises receiving the collectible, grading the collectible, encapsulating the collectible in a tamper proof casing, and printing or stamping at least one or more labels on the tamper proof casing, an electromechanical translation for moving the collectible within and between each step of receiving the collectible, grading the collectible, encapsulating the collectible in a tamper proof casing, and printing or stamping at least one or more labels on the tamper proof casing, and moving the collectible to an extraction area, a control module and an electronic communication between several computer-based devices to instruct and complete required actions in a specified order, a data storage for storing the data of the collectible and data associated to the collectible and wherein the device is operable to execute the method, which is operable to be a fully autonomous method where, after inserting the collectible into the device, there is no human interaction or interference.

According to an embodiment, it is a system, comprising, orienting a collectible to capture a plurality of images by an image capturing device of at least a first side and a second side of the collectible, a computer comprising at least one processor configured to receive at least one image of a collectible and at least one processing routine comprising an image processing algorithm for a condition assessment of the collectible applied to the at least one image by the at least one processor, wherein condition assessment of the collectible, is used for further generating a grade report, wherein the grade report is stored in a database, encapsulating the collectible in a tamper proof casing, and printing or stamping at least one or more labels on the tamper proof casing, wherein the printing or stamping of the at least one or more labels is at a specified designation on the tamper proof casing, wherein the system is configured to be fully autonomous where there is no human interaction or interference.

According to an embodiment, it is a system, comprising, orienting a collectible and capturing a plurality of images of at least a first side and a second side of the collectible, a computer comprising at least one processor, wherein the computer is configured to receive at least one image of a collectible and at least one processing routine comprising an image processing algorithm for a condition assessment of the collectible applied to the at least one image by the at least one processor, wherein condition assessment of the collectible, is used for further generating a grade report, wherein the grade report is an annotated grade report, encapsulating the collectible in a tamper proof casing, and printing or stamping at least one or more labels on the tamper proof casing, wherein the printing or stamping of the at least one or more labels is at a specified designation on the tamper proof casing, wherein the system is configured to be fully autonomous where there is no human interaction or interference.

According to an embodiment, it is a system, comprising, a computer comprising at least one processor to receive at least one image of a collectible and at least one processing routine comprising an image processing algorithm for a condition assessment of the collectible applied to the at least one image by the at least one processor, wherein condition assessment of the collectible, is used for further generating a grade report, wherein the grade report is stored in a database, encapsulating the collectible in a tamper proof casing, and printing or stamping at least one or more labels on the tamper proof casing, wherein the printing or stamping of the at least one or more labels is at a specified designation on the tamper proof casing, wherein the system is configured to be fully autonomous where there is no human interaction or interference, wherein the system further comprises an interactive display operatively coupled to the at least one processor and configured to display the at least one image to the operator.

According to an embodiment, it is a system, comprising, a computer comprising at least one processor, wherein the computer is configured to receive at least one image of a collectible and at least one processing routine comprising a machine learning algorithm for a condition assessment of the collectible applied to the at least one image by the at least one processor, wherein condition assessment of the collectible, is used for further generating a grade report, wherein the grade report is an annotated grade report, encapsulating the collectible in a tamper proof casing, and printing or stamping at least one or more labels on the tamper proof casing, wherein the printing or stamping of the at least one or more labels is at a specified designation on the tamper proof casing, wherein the system is configured to be fully autonomous where there is no human interaction or interference.

According to an embodiment, it is a system, comprising, a computer comprising at least one processor, wherein the computer is configured to receive at least one image of a collectible and at least one image processing routine comprising a machine learning algorithm for a condition assessment of the collectible applied to the at least one image by the at least one processor, encapsulating the collectible in a tamper proof casing, and printing or stamping at least one or more labels on the tamper proof casing, wherein the printing or stamping of the at least one or more labels is at a specified designation on the tamper proof casing, wherein the system is configured to be fully autonomous where there is no human interaction or interference.

According to an embodiment, it is an apparatus, comprising, a processor configured to obtain at least one still image of a collectible and identify at least one physical parameter of the collectible at least in part by analyzing the composite images using a deep learning technique.

According to an embodiment, it is a method, comprising, obtaining at least one still image of a collectible captured by an image capturing device, identify at least one physical feature of the collectible in the at least one still image using an automated image processing routine, overlaying the at least one still image of the collectible to form a composite image, identify at least one physical parameter of the collectible using a data catalogue stored in a memory, wherein, the method is a computer-implemented method for generating a grade for the collectible.

According to an embodiment, it is a system, comprising, a computer comprising at least one processor, wherein said computer is configured to receive at least one still image of a collectible by an image capturing device and at least one image processing routine applied to the at least one still image by the at least one processor to identify at least one physical feature of the collectible, overlaying the at least one still image of the collectible to form a composite image, identify at least one physical parameter of the collectible using a data catalogue stored, wherein a grade report of the collectible is generated based at least on results of the at least one processing routine, wherein the system is a computerized system configured for grading the collectible.

According to an embodiment an image capturing system includes a vision system where a variety of different camera types, lighting and image capturing functions are integrated.

BRIEF DESCRIPTION OF THE FIGURES

FIG. 38 is a view of an annotated grade report generated according to an embodiment of the disclosure.

DETAILED DESCRIPTION

Definitions and General Techniques

Figure 1:
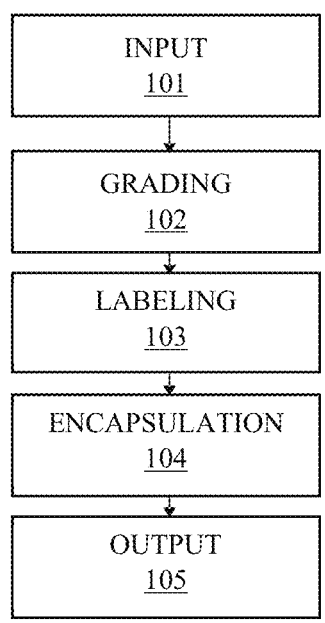
FIG. 1 is a flowchart of an autonomous process for grading, stamping, and encapsulating a collectible object according to an embodiment of the disclosure.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first", "second", "third", "fourth", and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include" and "have", and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left", "right", "front", "back", "top", "bottom", "over", "under", and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

The terms "couple", "coupled", "couples", "coupling", and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably", "removable", and the like near the word "coupled", and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

As used herein, the term component is intended to be broadly construed as hardware, firmware, and/or a combination of hardware and software.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, optical disks or solid state disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM disks, DVD-ROM disks and solid state disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., as a data server, or that includes a middleware component, e.g., an application server, or that includes a front-end component, e.g., a client computer having a graphical user interface or a Web browser through which a user may interact with an implementation, or any appropriate combination of one or more such back end, middleware, or front-end components. The components of the system may be interconnected by any appropriate form or medium of digital data communication, e.g., a communication network. Examples of communication networks include a Local Area Network ("LAN") and a Wide Area Network ("WAN"), e.g., the Internet.

The computing system may include clients and servers. A client and server are generally remote from each other and typically interact through a communication network. The relationship of the client and server arises by virtue of computer programs running on the respective computers and having a client-server relationship to each other.

Embodiments of the present invention may comprise or utilize a special purpose or general-purpose computer including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, solid state disks, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry a desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The foregoing disclosure provides illustration and description, but is not intended to be exhaustive or to limit the implementations to the precise form disclosed. Modifications and variations are possible in light of the above disclosure or may be acquired from the practice of the implementations.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The following terms and phrases, unless otherwise indicated, shall be understood to have the following meanings.

The term "collectible" also referred to as trading card or card is a small card, usually made out of paperboard or thick paper, which usually contains an image of a certain person, place or thing (fictional or real) and a short description of the picture, along with other text (statistics, trivia etc.) and can be a sports card or a non-sports card. It is an item that is worth far more than it was originally sold for because of its rarity or popularity for example sports cards, antiques, toys, coins, comic books, and stamps.

The term "autonomous" refers to intelligent machines that can perform tasks and operate in an environment independently, without human control or intervention.

The term "grading" means generating the collectible condition data and assigning a grade based on the assessed condition of the card.

The term "stamping" means stamping data on a label.

The term "label" means any printed tag or slip with data such as serial number, Quick Response (QR) code etc.

The term "slab" means enclosing or encapsulating a card in a tamper proof casing.

The term "adaptive casing" is a temporary casing also referred to as the case, where the trading card is placed for the autonomous grading process and where the adaptive casing is controlled to adjust the orientation of the card to a camera view.

The term "Field Of View (FOV)" is the maximum area of a sample that a camera can image which includes areas of interest as well as areas of non interest.

The term "composite image" means an image made up of two or more captured photographs, which are combined to create one image.

The term "grading slab", sometimes abbreviated and referred to as slab, denotes the case that a card gets encapsulated after it is graded. Since the grading of the card is presented on the slab it is referred to as a grading slab.

The term "set" means one or more of a kind.

The term "electromechanical" means relating to or denoting a mechanical device which is electrically operated and refers to devices which involve an electrical signal to create mechanical movement, or vice versa mechanical movement to create an electric signal. For example, electromechanical devices often involve electromagnetic principles such as in relays, which allow a voltage or current to control another, usually isolated circuit voltage or current by mechanically switching sets of contacts, and solenoids, by which a voltage can actuate a moving linkage as in solenoid valves.

The term "raw data of condition of the collectible" is also referred to as primary data, is the data collected from a collectible for the analysis of its condition and includes collectible's data on centering, corners, edges, and surface defects.

The term "tamper proof" means hindering, deterring or detecting unauthorised access to a device or circumvention of a security system. Tamper proof casing uses packages to deter package or product tampering. A tamper proof casing may be equipped with one or more of tamper resistant, tamper detection, tamper response, and tamper evidence. It may also mean a case or device where tamper is evident and may or may not be tamper resistant.

The term "degrees of freedom" means a number of independent parameters that define the configuration or state of a mechanical system. The position and orientation of a rigid body in space is defined by three components of translation and three components of rotation, which means that it has six degrees of freedom. In translational degrees of freedom, the body is free to change position as forward/backward (along x-axis), up/down (along y-axis), left/right (in z-axis) translation in three perpendicular axes. In rotational degrees of freedom, the body is free to change orientation through rotation about three perpendicular axes, often termed roll (rotate about x-axis), yaw (rotate about y-axis), and pitch (rotate about z-axis). The body is free to have combinations of one or more translational and rotational degrees of freedom.

The term "tilt angle" means an angle between a plane defined on the object of interest and the horizontal plane that intersects and is measured in degrees or radians.

The term "motor drive" or simply known as drive, describes equipment used to control the speed of machinery.

The term "motion capture" is the process of recording the movement of objects or people. A motion sensor may be a visual camera or an inertial measurement unit (IMU).

The term "laser rangefinder", also known as a laser telemeter, is a rangefinder that uses a laser beam to determine the distance to an object.

The term "omnidirectional motion" means a 2D planar motion capable of translation in x and y and rotation around their center of gravity giving three degrees of freedom (3 DOF).

The term "extendible member" means a member capable of being extended thereby changing the extendable member between a shortened condition and a lengthened condition. An example may be an arrangement in a telescopic nesting formation.

The term "pivot" means the central point, pin, or shaft on which a mechanism turns or oscillates and pivotally mounted means any member which is pivot joined.

The term "tolerance" means the extent by which a value is permitted to vary. Specifying tolerance defines the acceptable limits of variance required for a particular measurement.

The term "QR code" is abbreviated from Quick Response code which means a type of matrix barcode or a two-dimensional barcode that is generally used in product tracking, item identification, time tracking, document management, and general marketing.

The term "touch screen display" means an assembly of both an input ('touch panel') and output ('display') device. The touch panel is normally layered on the top of an electronic visual display of an information processing system. The display is often an LCD or OLED display. A user can give input or control the information processing system through simple or multi-touch gestures by touching the screen with a special stylus or one or more fingers. The user can use the touch screen to react to what is displayed and, if the software allows, to control how it is displayed; for example, zooming to increase the text size. The touch screen enables the user to interact directly with what is displayed, rather than using a mouse, touchpad, or other such devices (other than a stylus, which is optional for most modern touch screens). Wherever display or graphical display is used, it may mean touch screen display.

The term "cardstock" or "card stock" also called "paper stock" refers to paper that is thicker and more durable than normal writing and printing paper, but thinner and more flexible than other forms of paperboard. Trading cards have been usually made from rectangular cardstock. Card stock is often used for business cards, postcards, playing cards, catalogue covers, scrapbooking, and other applications requiring more durability than regular paper. However, it can refer to any material that a trading card is made of.

The term "residual" means remaining after a part or some quantity has gone with reference to the actual or original trading card. It is used to measure missing quantities or how close an edge or a corner of the cardstock comes to the mathematical or perfect lines that define the edge and the corner.

The term "fill" refers to the extent to which the cardstock is present throughout the mathematically or perfectly defined corner or edge.

The term "fray" refers to the fall-off in the cardstock particularly near a corner or an edge.

The term "image capturing device" refers to a still camera, a video camera, an infra-red camera, an ultra-violet camera, a vision system, a camera/s integrated with a lighting system, and a plurality of cameras of similar or different types. It may be a part of an image capturing system.

Sports enthusiasts who collect sports cards desire cards that are in the finest condition. Collectors do not want to overpay for a low-quality card or sell a high-quality card for less than it is worth. In the approximately $13 billion industry, some of these sports cards can be valued well over tens of thousands of dollars. The condition of these cards is the main driver of their value. Improper grading of the condition of these cards by professional graders can result in thousands of dollars of undervalued or overvalued cards.

Currently, commercial and private grading companies use professional graders to manually grade many cards. Experienced graders can spot the smallest of imperfections that can affect the value of a card by hundreds or thousands of dollars. Experience is therefore the most important quality of a professional grader, and experience is exactly what the industry is lacking.

Grading of a card is currently performed by the human eye and there is much subjectivity involved in grading. If the same card is graded twice by a grading company, it is highly likely that the grades obtained for the same card during two different grading sessions are different. In an embodiment, the invention is grading sports cards on a 10-point scale based on the condition of the card, fully by computers and by automation. Fully automated and computer-based grading will bring in complete objectivity to the market and have a standard that is set in the process. In automated grading, when a card is run through the machine, it provides an accurate readout of the condition, and provides a grade. Next time when the same card is run through the machines, as long as there is no further damage or there is no change in the condition of the card during the process of removing it from the case and putting it back in, the grade will remain the same. This is not the case when a grade of the card is generated by a person. Thus, with the automated process of grading, the human element in assessing the grade or condition of the card is removed. The value will further depend on the condition of the card.

Grading of cards is based on various characteristics that pertain to the general eye appeal of the card. Characteristics of the card that are universally examined in the grading process are centering, corners, edges, and surface. Centering is the placement of the image (top to bottom and left to right) on the card relative to the card borders. Industry standards exist for percentage of off centering variance permitted for each of the possible card grades. The corners of the card are inspected to determine the quality of the physical condition of the corner and/or if any defect of the corners is present. The edges of the card are examined, similarly as the corners, to determine the quality of the physical condition of the edges of the card, and account for any damages and/or imperfections along the edges. The surface of the card is examined to account for any damage and/or imperfections on the card, such as scratches, creases, tears, pinholes, stains, dents, attempts at recoloring, etc.

While the device will be grading the condition of the card, it is important that the device is a safe environment for all cards. Essentially, the card is not to be damaged inside the device while being handled by a human or a machine. All damage to the card must be prevented, and the card should be handled minimally by both man and machine. The operator touches the card twice, once when inserting the card into the system, and once when removing it. There is no other human contact with the card to move it during the process. While the card is inside the machine, it gathers data for assessing the condition of the card. The device scans both sides of the card with all cameras/sensors by altering the orientation of the cameras and/or sensors. It evaluates the sharpness of the card corners by measuring the corner angle to the nearest degree. In addition to the detection of physical defects/damages, the device can detect the centering of the image on the card to the nearest 0.5 mm. It further evaluates any defects or damages present on the surface or anywhere on the card.

In an embodiment, the device takes about a minute to scan, compute, process, and output the card condition data. Moreover, the machine exhibits a long runtime and doesn't freeze or require reset after a few grading cycles. The device can be operated continuously for many hours without any issues.

Since the biggest issue with card grading has to do with the subjectivity of the grading process, the device eliminates subjectivity by objectively collecting the card condition data and processing all collected data. The device produces similar data and grades for a card when tested more than once. The desired operator usually is a professional grader although it is simple to be operated by anyone. It should take no more than an hour of instruction/training to learn how to customize and operate the machine. The device is portable and hence easily moveable.

Sports Card Grading

In calculating the value of a sports card its condition plays a crucial role. Therefore, determining the condition, and in turn, the value of the cards is very critical. While grading sports cards by humans is subjective, there are widely established standards that most people in the industry follow.

Cards are graded based on the primary attributes of Centering, Corners, Edges, and Surface. Sometimes autographs are also included in the analysis. Each attribute is generally given a grade of 1-10 and then combined to get the overall final grade of the card on a scale of 1-10.

Centering: Centering is basically the width of the border. Ideally, the border sizing should be equal on the left, right, top and bottom. Sometimes judging the centering won't be as simple as looking for equal borders. The ultimate criterion is that the card should feel balanced. If a card appears lopsided, this means the centering is off.

Corners: This is arguably the most important and most scrutinized of the grading attributes. A card with four sharp corners can alleviate other concerns, especially on older cards. All four corners are analyzed looking at the front of the card and then looking at the back of the card. All the corners are checked for any imperfections either on one side or on both sides.

Edges: The four edges of a card are important. Edges should be sharp, and the color should be constant. Edges are observed for imperfections such as peeling off, dings, dents, or subtle discolorations.

Surface: Surface is the condition of the card considered as a whole. Cards are observed for glossy finish, scratches on the surface, and faded autographs. If the card is made of foil stock, they are observed for imperfections or defects like small pieces of foil coming off, leaving white specks on the card. The cards are observed for creases, moisture damage, ink smearing, and stamp marks. Many times, a crease is hard to notice, as the picture on a card can hide one very well.

Autographs: The autograph grade has nothing to do with the grade given to the card itself. Autographs are usually checked for ink smears or fading. All graded autographs are out of pack autographs and not hand-signed or in-person.

Fully Autonomous Card Grading, Stamping and Encapsulating Process

Fully autonomous grading cycles, after the process of inserting the collectible into the device, any involved processes will not require any human interaction/interference once the cycle has begun, unless the user desires.

Printed collectibles that are received by the company will be sorted by hand and delivered to their designated grading areas. A fully autonomous card grading, stamping and encapsulation process is followed by the device also referred to in this disclosure as SmartEye. For those that will be graded by the SmartEye, the device will operate under a trained professional, with applicable knowledge on the grading standards of printed collectibles. This operator will be responsible for inserting and discarding printable collectibles in bulk into the device. Once the collectibles are released into the device, the autonomy has begun. In an embodiment, for inexpensive card types, there will be a single mounted slot for a bulk stack, and for expensive card types, there will be multiple isolated "platforms" where each card will be handled individually.

When a SmartEye device is purchased by a customer, the device will be programmed/customized by the user before any grading takes place. The company preferences, scales, and tolerances will be input into the settings of the device so the processes can be scaled accordingly. These settings can always be changed at any time. This ensures that the user does not have to continually update any parameters during designated grading time periods. This confirms that once grading has begun, it remains independent from the user. Rolls of printer paper, and specialized label paper will be loaded into the appropriate canisters, as well as several tamper-proof slabs which will have another designated storage area. These are preliminary operation requirements that will be done prior to large sets of grading cycles.

Figure 2:
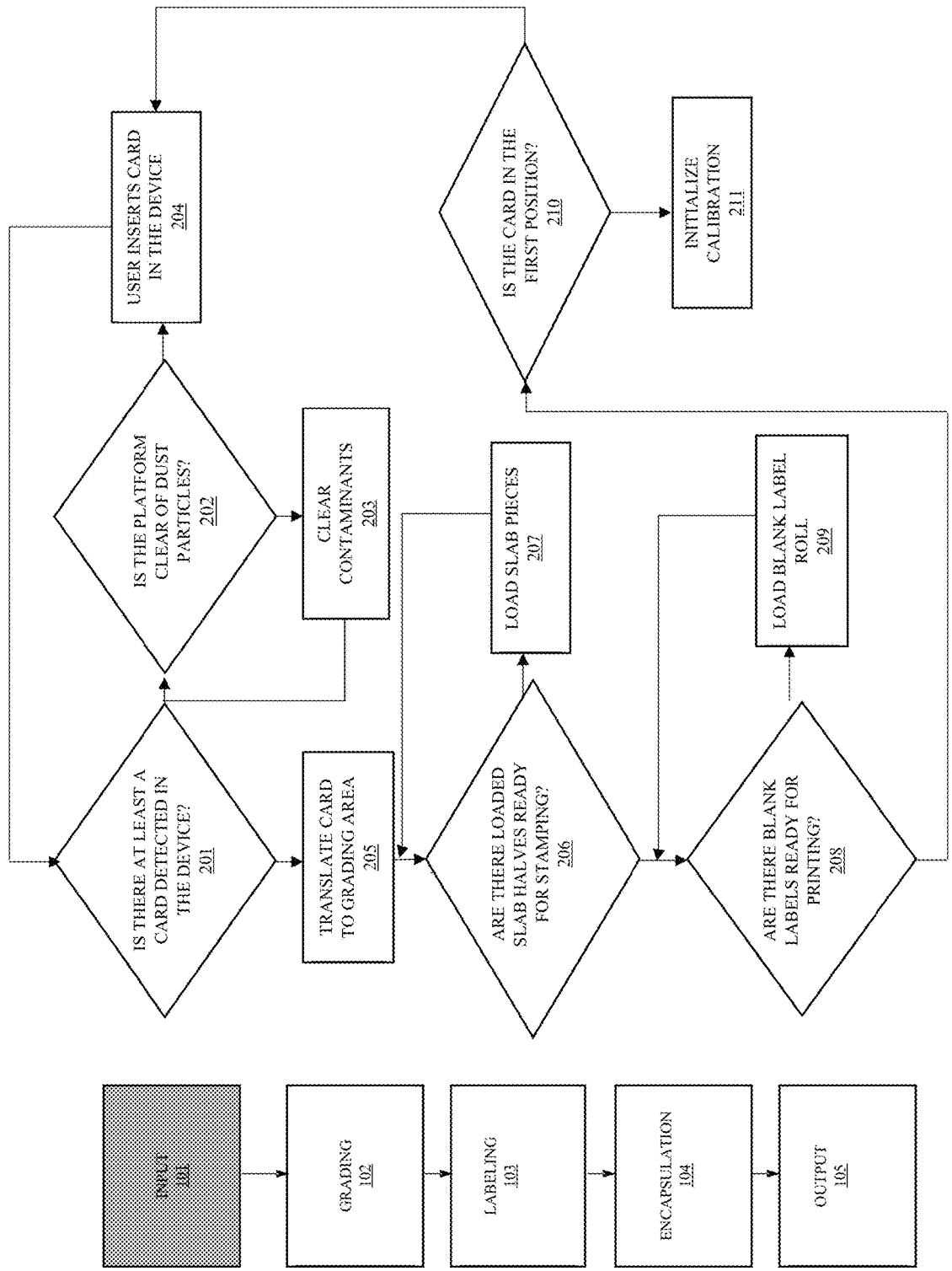
FIG. 2 is a flowchart of Input block of the autonomous process according to an embodiment of the disclosure.

FIG. 1 shows the autonomous process comprising the steps of input 101, grading 102, labelling 103, encapsulation 104 and output 105. FIG. 2 shows the process flowchart of the input process. This is where the user input starts and ends. The device is going to be able to detect whether there is a card placed in there at 201. If there is a card placed into the system, then the system will be able to detect with the help of a sensor. If the system finds the card, then it is moved to bring the card to the area where it can be graded. If the card is not detected, then the system would wait for the user to clear the input area of dust particles at 202 and 203 and let the user insert the card at 204. Once the card is loaded, and the device knows that the card is in there, it is going to translate the card from that loading area to the grading area at 205. Grading area is where all the cameras are. Then the machine checks for loaded slab halves for stamping at 206. The machine is going to have sections of the graded slabs that the card is going to be encapsulated in. The machine is provided with a loading area for slabs as well as a loading area for the labels that are going to go in the cases. The machine or device checks if there are labels at 208. If the device finds either slabs or label rolls missing at 207 and 209, then it will prompt the user or operator to load them in the machine. The machine can detect whether or not there are loaded slabs or loaded labels. The device then checks the card position at 210 and begins the calibration process at 211 and then moves on to grading.

Figure 3:
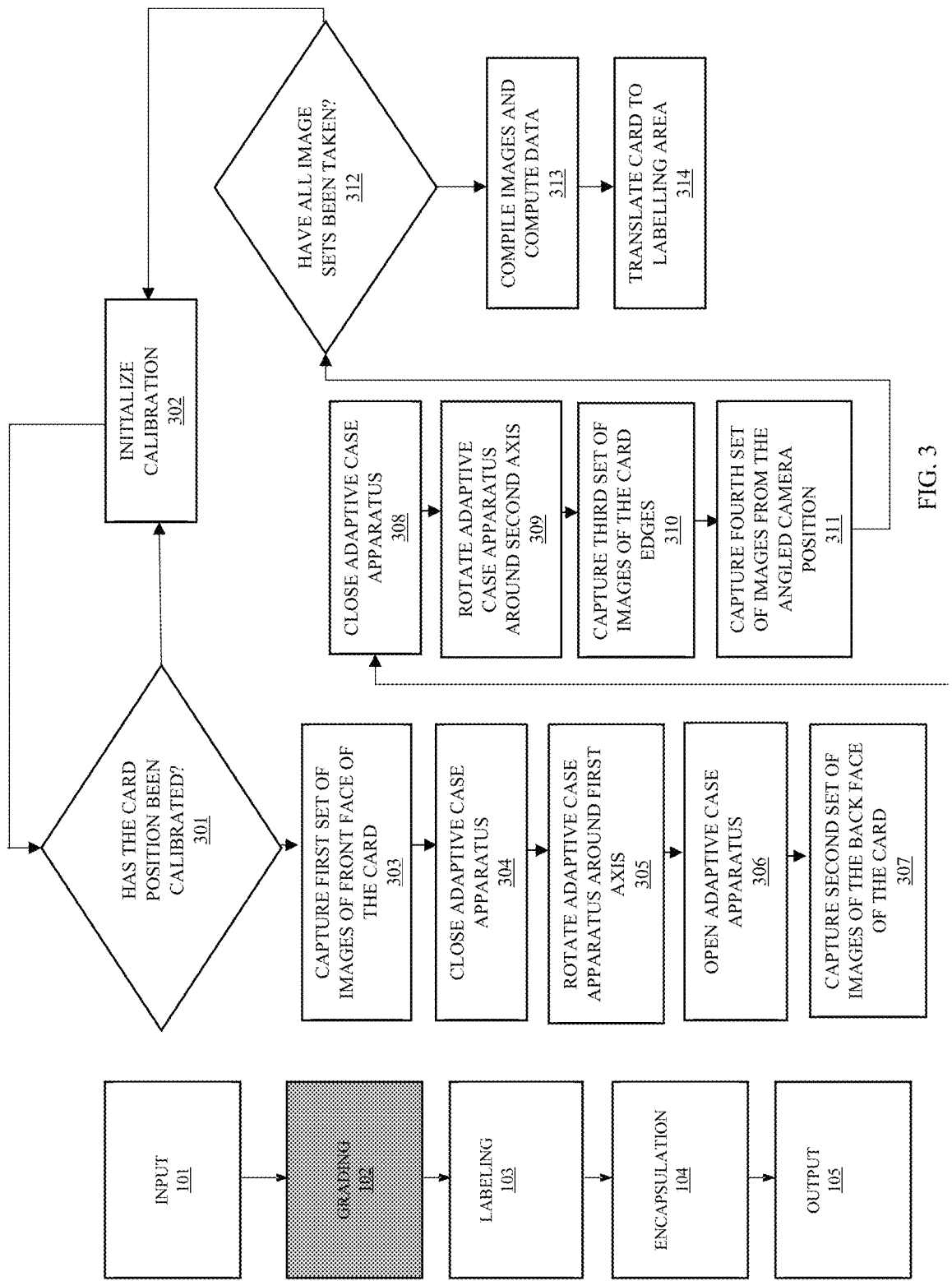
FIG. 3 is a flowchart of Grading block of the autonomous process according to an embodiment of the disclosure.
Figure 4:
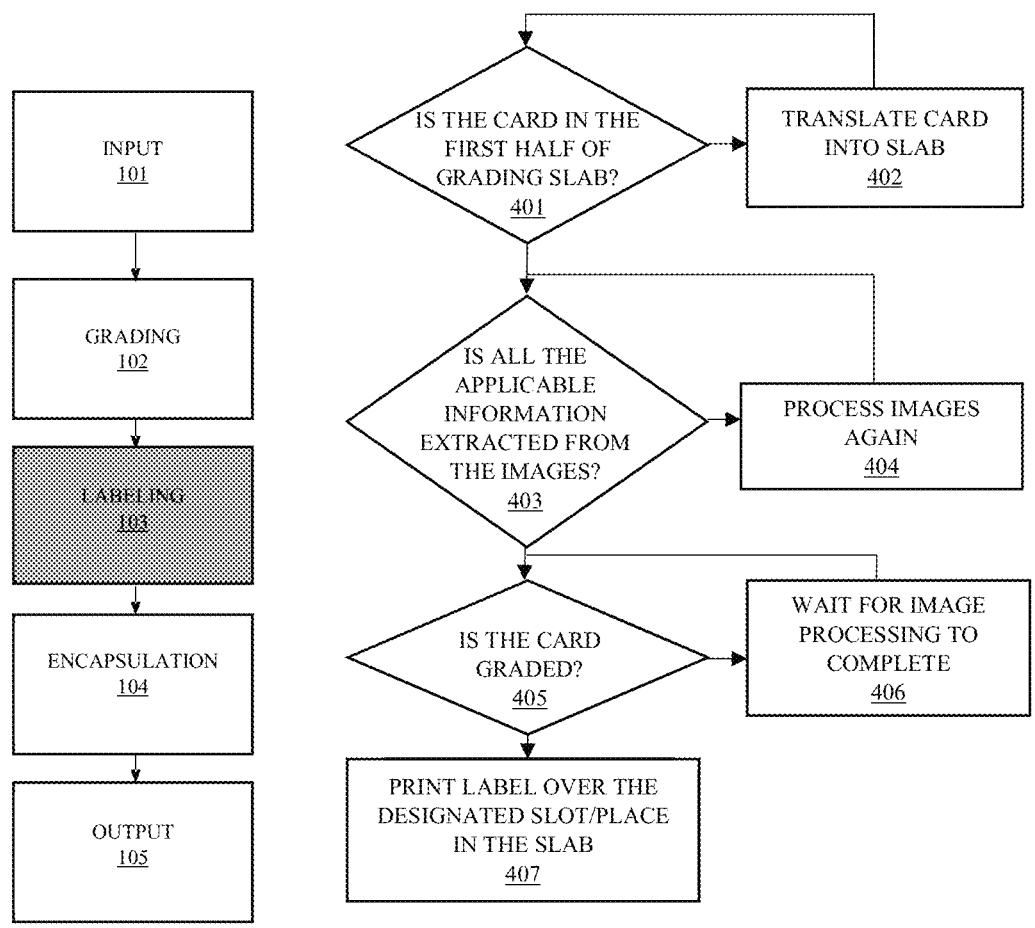
FIG. 4 is a flowchart of Labelling block of the autonomous process according to an embodiment of the disclosure.
Figure 5:
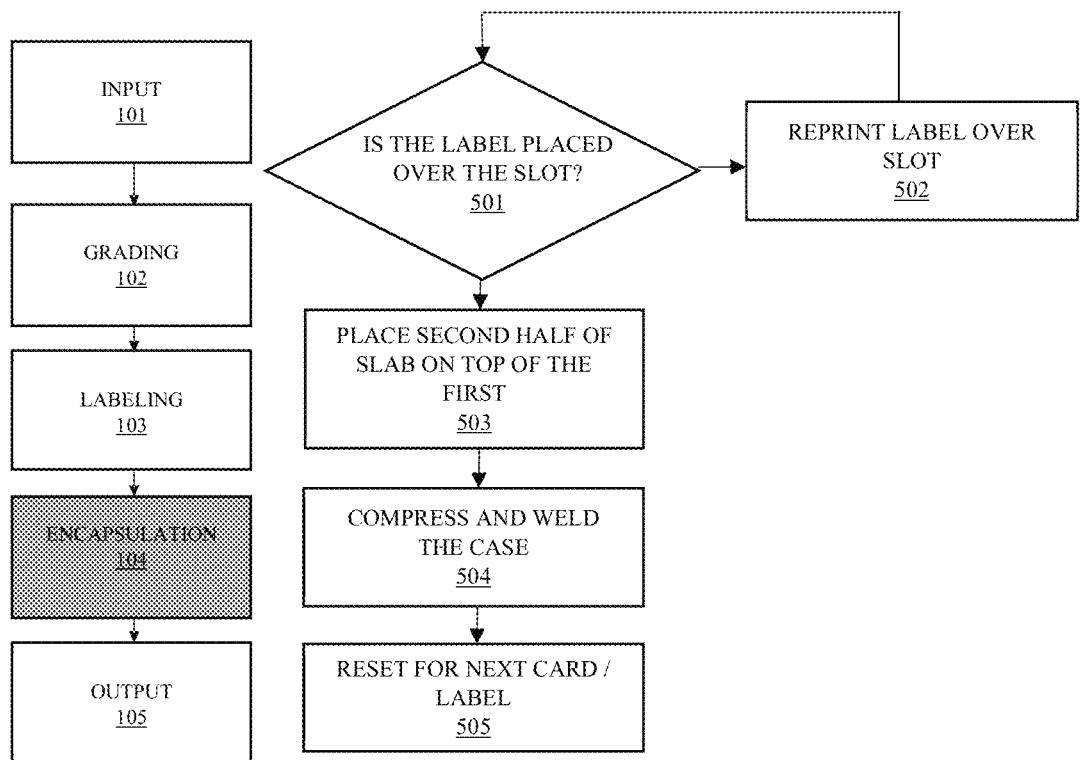
FIG. 5 is a flowchart of Encapsulation block of the autonomous process according to an embodiment of the disclosure.
Figure 6:
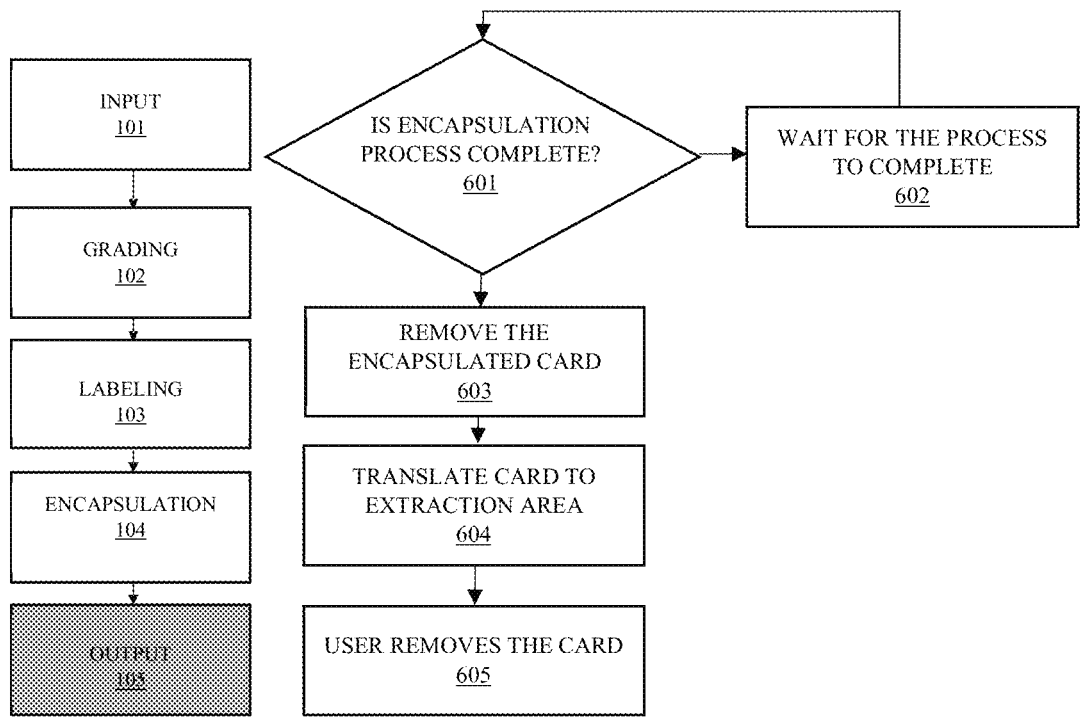
FIG. 6 is a flowchart of Output block of the autonomous process according to an embodiment of the disclosure.

FIG. 3 shows the Grading process flow chart of the autonomous process. Grading, at a very broad level, before the start of the process, detects the card position at 301, whether it is in a level position, normal to the face of the camera. If the device has not been calibrated to the card position properly, then the device recalibrates again at 302. Once the calibration process is complete, the device captures the first set of images of the front of the face of the trading card at 303, then it closes the temporary case apparatus, also called as adaptive casing at 304. It will then rotate about the first axis to 180 degrees, i.e., flip the adaptive casing and thus flip the card inside the casing at 305, and then open again at 306 to reveal the backside of the card or collectible. The device then captures the second set of images at 307 and closes the adaptive casing at 308 to rotate again about its second axis at 309. The device then captures a third set of images from the edges of the card at 310. The device then captures a fourth set from an angled position of the card at 311. The device checks whether it captured all four sets of images at 312. The images are captured by controlling the lights, as pre-calibrated for each set, to find defects and find differences on the surface of the card using image processing methods. The device uses a few or all of these image sets to be able to extract as much information as possible from the images of the card using image processing methods. Once all the images are taken and data is computed at 313, then the device translates the card again to the labelling area at 314. In the labelling area, as shown in FIG. 4, the device checks if the trading card is in the first half of the grading slab at 401. The term grading slab denotes the case that a card is encapsulated in, sometimes abbreviated and referred to as slab, after it is graded. Since the grading value of the card is presented on the slab it is referred to as a grading slab. If it is not in the slab, it will be made sure that the card is placed in a half of the slab at 402. Then the device performs a check to see if all the applicable information is extracted from the images at 403. If the information is not extracted, then the images are processed again at 404 to find any other relevant information using image processing methods either missing or as a recheck. The process then checks if the grading is complete at 405 and if not, it waits for the image processing to complete at 406. Then the device collects and arranges all the necessary predefined information, for example the name of the player on the card, the rarity of the card, Quick Response (QR) code, assigned serial number etc., and prints the information on the label at designated location and translates the printed label to a designated location on the slab case at 407. The unprinted label will be in a roll similar to a ticket roll, which will be sliced or cut off into the desired position and size. The device then begins the encapsulation process. Encapsulation process, as shown in FIG. 5, will be a standard sonic welding as used in the grading companies. The device checks if the label is placed over the slot at 501. If not, the label is reprinted again at 502. Then the device makes sure that the trading card is in the bottom half of the case and then the device mechanically places the top half of the case on top of the bottom half with the label inside at 503. The device then sonic welds the two halves together to secure the card at 504. Based on the friction that comes from the sonic welding, the label is going to shear off from the rest of the role of the tickets. Once the card is sonic welded. i.e., encapsulated in the slab, the encapsulation device is reset for the next card/label at 505 and then the card is moved to the output section. In the output, as shown in FIG. 6, the device or mechanical system checks whether the encapsulation process is complete or not at 601. If it is not complete, it waits for the process to complete at 602. Once the encapsulation process is complete, the device removes the encapsulated card from the encapsulation area at 603 and translates the card to the extraction area at 604. The system places the cards on to a platform where the platform is free from any moving parts. The user or operator can then go and just pull the graded, labelled, and encapsulated card out at 605. The device is configurable to stack the cards as needed or place them individually in the extraction area. The device will be able to stack the cards to a certain number, or to a certain height so that a user can pick or collect a stack at a time rather than picking them individually. After the insertion of a card at the input to grade into the machine, the user interaction comes back at output to collect the card or cards which are graded, labelled, and encapsulated. Everything between placing the card in at the input step and taking the card out at the output step is a fully autonomous process.

The following steps describe a fully autonomous processes according to an embodiment:

(a) Once a stack of cards is in queue, meaning the cards are placed into the device and awaiting grading, sensors will detect the cards in the appropriate slot/platforms and prompt the device to begin. Sensors used can be such as light sensors, force or pressure sensors, infrared sensors or simply a camera.

(b) Regardless of the card type, an integrated mechanical contraption will extract one of the cards from the stack or transport the platforms to the grading area.

(c) The inexpensive cards will be mechanically inserted into the adaptive casing device that rotates the card. The platform that holds the expensive cards will be integral to the adaptive case according to an embodiment.

(d) A detection unit will align the motors such that the top surface of the case is horizontal.

(e) At this stage, the adaptive case is open and an image capturing device will take multiple images of the card with different light sources and brightness of light relative to the card's position.

(f) The case closes and rotates 180 degrees and reopens. As a result, the collectible is flipped. A detection unit will level the top surface of the case and a second set of images will be captured with different light sources and brightness of light relative to the card's position.

(g) A few more image sets are captured from the edge, and at different orientations with pre-defined controlled sets of lights and lighting.

(h) Image processing routines will process the images and extract the information. They detect potential defects such as, centring, edge condition, corner condition, and surface conditions such as bends, tears, stains, scratches, discolorations, cuts, color fading, alterations, re-coloring, bleaching of image and/or card, chips, dents, added color to fill in areas of defect, printing errors, the effects of bleaching, stain removal, the addition of material (i.e., paper stock) or other material and image removal for the purpose of altering the width of the collectible's borders to re-center the collectible.

(i) The necessary scales and tolerances will calculate a 1-10 grade on a base 1000-point scale and will assign that grade to the appropriate collectible based on the predefined grading condition criteria and overall grade adjustment rules. The variance of the scale can be changed depending on where on the scale the grade is located. For example, between a grade of 5 and 10 one can set a variance of 0.1 increment and between 1 and 5 one can set a variance of 0.5 increment on a 10-point scale. A variance of 5% or a range of 0.01% to 10% variance can be implemented. The scale can be varied based on the grade range. For example, 0.1% increments in the higher range and 1% increment in the lower range instead of a fixed variance over all of the grade scale.

(j) The device will assign a readable barcode, Quick response (QR) code, or serial number that will mark that collectible as a graded entity. The data will be saved and stored into a database to be used for detecting regrading and to aid in the process of grading similar collectibles.

(k) Following grading, which involves the mechanical manipulation to grade both sides of the collectible, as well as automatic item condition feedback/recording, possible background checking, and digital review, etc., the collectible will be immediately transported to the next stage without the need of human interference.

(l) The collectible, within the temporary adaptive case will be moved as one object to the next step in the process through some electromechanical translation, (conveyor, gear rack, belt, etc.). The case will then be opened once again.

(m) There will be a set of temporary cases to take the previous case's place as they move from grading to stamping. The reiteration and replacement cycle of cases will be done using other electromechanical components (motors, gears, pulleys, belts, etc.).

(n) The tamper proof slabs will be gravity fed into the stamping area where the slabs will be sonic welded by the hydraulic, or pneumatic press.

(o) A second mechanical extraction process will transfer the card from the temporary case to a standard tamper proof slab.

(p) All applicable information that is necessary to be included in/on a tamper proof casing, including grade, serial numbers, QR coding, barcodes, company name, etc., will be electronically printed on the standard slab label.

(q) The printer will have a guide that will place the label in the appropriate section of the slab.

(r) The press will stamp down the case and seal the card and label inside using standard industry sonic welding techniques. A force detection unit will measure the applied force of the hydraulic/pneumatic press to the slab to perform consistent and adequate seals.

(s) The graded, enclosed, collectibles will be moved out of the designated stamping zone via the same electromechanical transportation system (conveyor, gears, belt, pulleys, etc.) and transported to an extraction area where graded collectibles are stacked.

(t) These slabs can be removed from the device individually or in plurality.

(u) A detailed annotated report, including all the relevant information used in determining the collectibles grade, will be printed out in the order that the collectibles were graded and will also be stored in a database along with the card details.

(v) Once the sealed collectibles are removed from the device, the autonomy ends.

(w) At any point, the user can use the interactive display to further investigate the captured images to manually inspect and review the collectibles. Reviewing the card does not affect or influence the device's grading in any way, ensuring that the processes remain autonomous.

From the time where the operator presses the start button on the computer screen/display, the camera captures the images or pictures and will be assessed completely automatically without any human input for grading. The cards are stamped and then encapsulated in a tamper proof casing. The only user input is hitting the Start button and then taking out the card which is graded, stamped and encapsulated.

The System

Figure 7A:
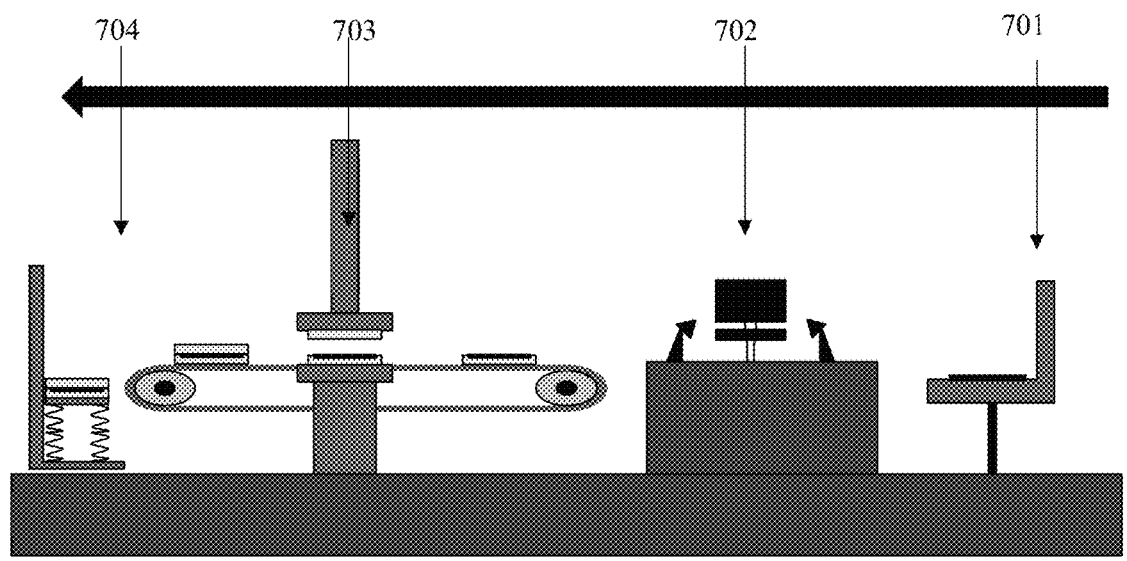
FIG. 7A is a view of a fully autonomous system for grading, stamping, and encapsulating a collectible object according to an embodiment of the disclosure.

Fully autonomous system for grading, stamping and encapsulating a collectible object is shown in FIG. 7A. The system has a designated waiting area or a loading area at 701. This is the place where cards are inserted into the system. The card is then sent to a grading area at 702 where it is graded based on both sides of the card. The information is transferred through the network, saved to a database. This is the information that will also be included in a report. The card is then labeled and encapsulated in the grading slab at 703. The card is transferred to an extraction area where a single, or stack of cards can be extracted at once at 704.

The system requires a single input of a mass of collectibles at 701. Movement from grading stage 702 to another is by electromechanical translation. Once the grading process is completed at 702, the cards are encapsulated in a tamper proof casing and automatically printed with a grade label at 703 and sent to the extraction area at 704. The device further provides a report with printed outlines, annotated reports, that inform and support the processed images of the graded collectible. It is a self-feeding device meaning no external human interface is required for the device to complete the grading process or slab and stamping of the cards. The device performs mechanical placement of the slab into position before sealing the tamper proof slabs. Electromechanics directly seal the tamper proof slabs without the aid of the user. The device further comprises a programmable grading which is configured to unique company standards, tolerances, and scales.

Figure 7B:
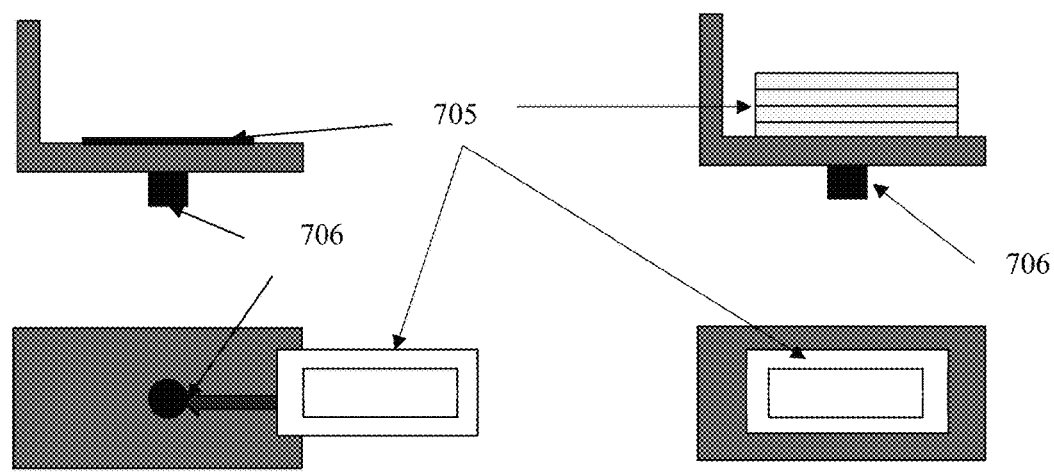
FIG. 7B is a view of a fully autonomous system receiving area or waiting area according to an embodiment of the disclosure.

FIG. 7B shows the card waiting or loading area. The cards, 705, are loaded either as a single card or a stack of cards. A sensor, 706, detects if the cards are loaded and are in place for grading or not.

Figure 7C:
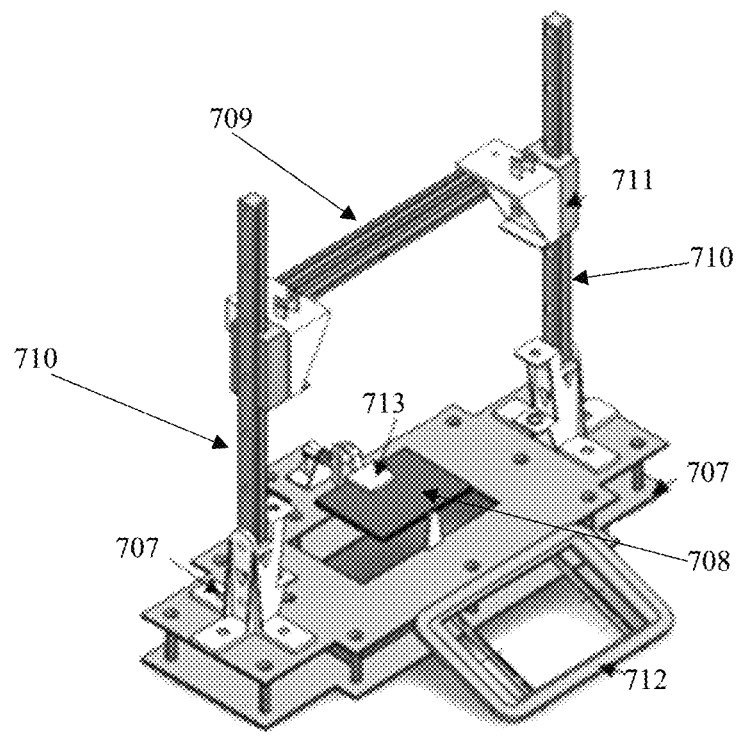
FIG. 7C is a view of a fully autonomous system grading area with mechanical, electrical, and computer subsystems integrated with graphical display for user interaction according to an embodiment of the disclosure.
Figure 7D:
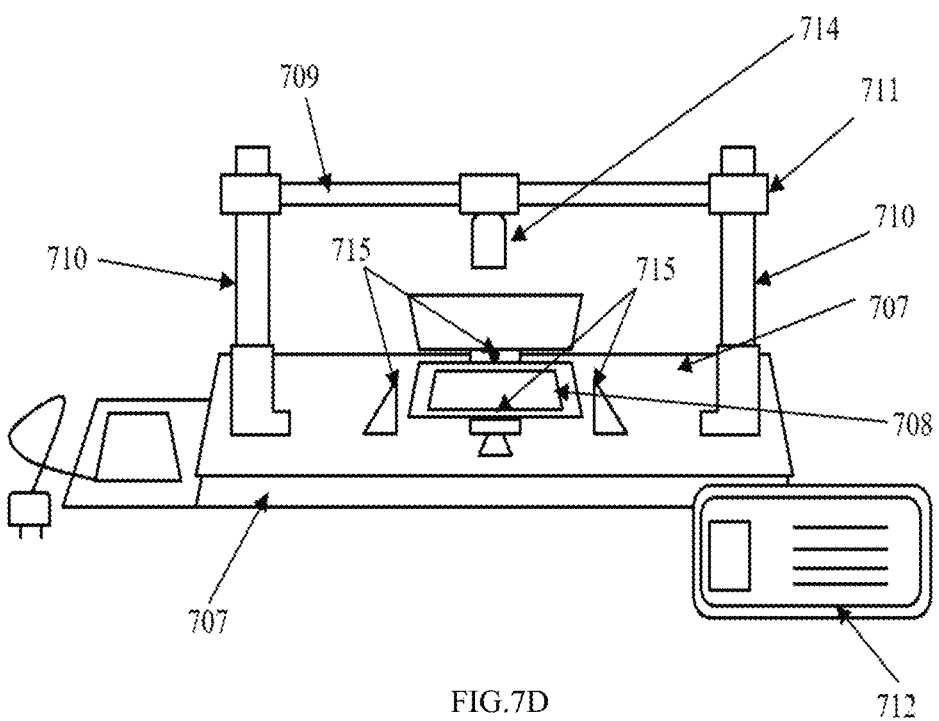
FIG. 7D is another view of a fully autonomous system grading area with mechanical, electrical, and computer subsystems integrated with a touch screen display for user input and interaction according to an embodiment of the disclosure.

FIG. 7C and FIG. 7D shows the card grading system, which comprises mechanical, electrical and internal logic and image processing subsystems. The system provides enhanced conditions for the image processing, while protecting the card from any potential damage and/or contaminants.

Mechanical Subsystem

FIG. 7C and FIG. 7D shows the system according to an embodiment integrated with mechanical, electrical and computer subsystems for autonomous grading followed by labelling and slabbing. One of the features of the system design is the static structure, system foundation and support 707, that simply keeps all other components rigid to reduce vibrations throughout the system while in operation. Another feature is the dynamic card rotation subsystem which is an electromechanical rotating platform for orienting a collectible to capture a plurality of images by an image capturing device. The purpose of the rotation subsystem was to provide a safe encasement using an adaptive casing 708 for the sports cards/trading cards graded with the system. The system or device to assess the condition of the sports card comprises a camera. The camera 714 is mounted on a rail or on a crosshair crossbar 709 above the sports card. The grading cycle starts with the crossbar suspended at position. There are linear guide rails 710, and the crossbar is configured to slide up and down to get closer or move away further from the card. The crosshead mounts and guide rail car are shown at 711. The machine can automatically lower the cross down and lock it into place at a set distance above the card. The camera is powered by a microprocessor e.g., Raspberry Pi® or a computer. There is a Liquid Crystal Display (LCD) screen or a digital screen, similar to that of an iPad® or iPhone®, on the machine is provided at 712, where the operator will be able to start or control a grading cycle. An adaptive casing 708 is designed to handle the card while grading and lift up automatically and allow the camera to capture the views of the card directly and to rotate at the hinge 713. The system further comprises a microprocessor e.g., Raspberry Pi® and a support frame which holds the Liquid Crystal Display (LCD) display in an aesthetic and easy-to-read orientation. The full frame of the system secures the camera and adaptive case. The camera 714 is mounted on an adjustable guide rail which allows the user/machine to manipulate the distance of the camera from the case. The camera mounting system is automated and mechanized to position itself based on the desired grading protocols and programs. The camera captures the images and everything on the card, all the corners, edges, effects are analyzed to assess the condition of the card under a source of light 715. There can be a single or plurality of light source 715 and can either be stationary or move around an axis with the aim to illuminate the card from different directions and with different intensities. These sources of light 715 are adjustable in position and angle. The device is for sports cards as well as the other collectibles industry including coins. The system or device can be used for other condition assessment applications.

According to an embodiment, the adaptive case 708 of FIG. 7C and FIG. 7D is made of a soft, flexible material, Thermoplastic Polyurethane (TPU), that provides a dark contrast to the white border of each card graded by the system. For non-white border cards, a contrast background or an algorithm that differentiates the border from background are formulated for determining the centering. The case provides a safe and temporary environment for the card while its orientation is being manipulated by the motorized rotation. Detection units are provided to enable feedback to a microprocessor to determine the status of specific actions. Interactive display 712 is provided on the device to permit user inspection and orientation/size manipulation of the captured images of the collectible. There is electronic communication between several computer-based devices to complete required actions in the specified order of operations. The system is configured, under control of the processor, to send a further task to the processor, wherein the further task replaces the current task.

Figure 7E:
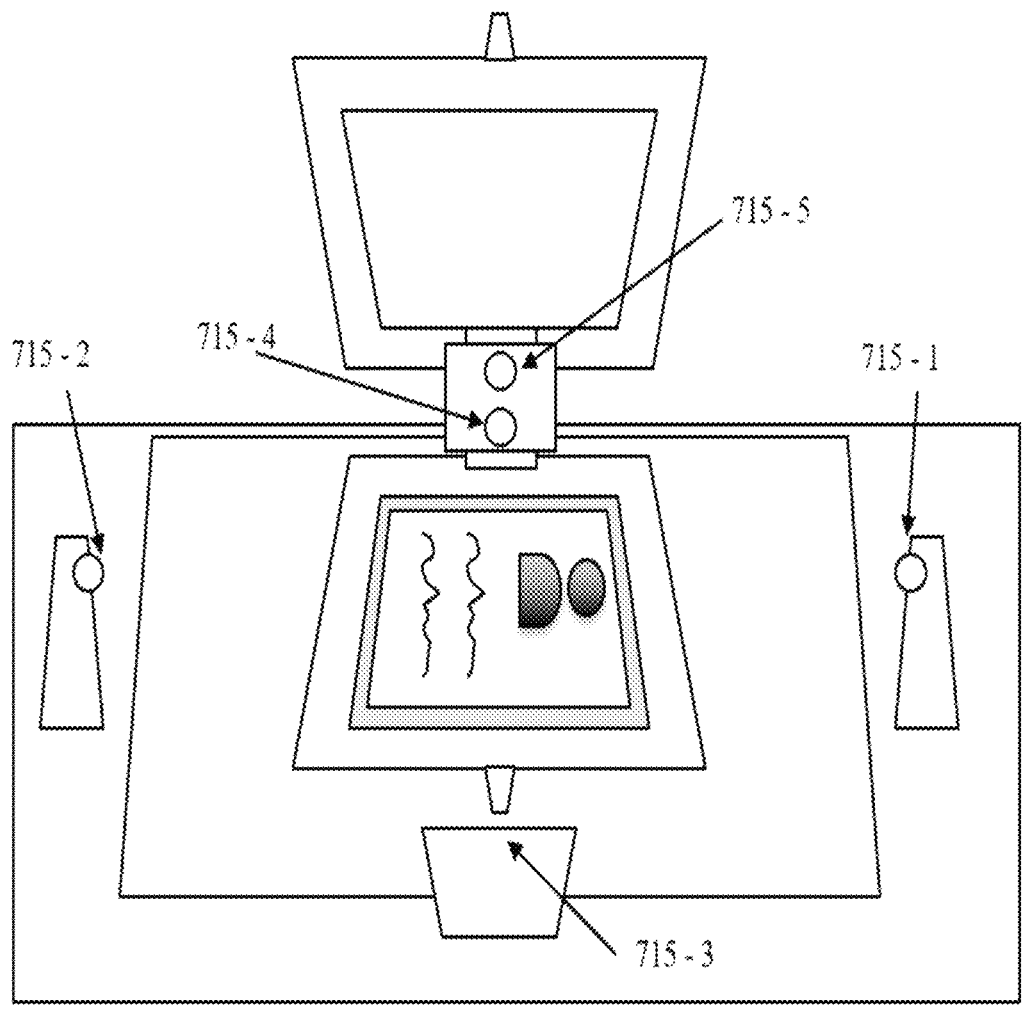
FIG. 7E is a view of a fully autonomous system grading area with LED light system arrangement according to an embodiment of the disclosure.

According to an embodiment, the light sources will shine over the surface of the card from an angle. These lights will be positioned around the four sides of the card as shown in FIG. 7E. The position of the lights is defined with respect to the cards center as, top side 715-1, bottom side 715-2, right side 715-3 and left side 715-4 and 715-5. The lights can either be stationary or move around the horizontal axis. These LEDs are positioned and angled such that they are made to point towards the center of the card.

Figure 7F:
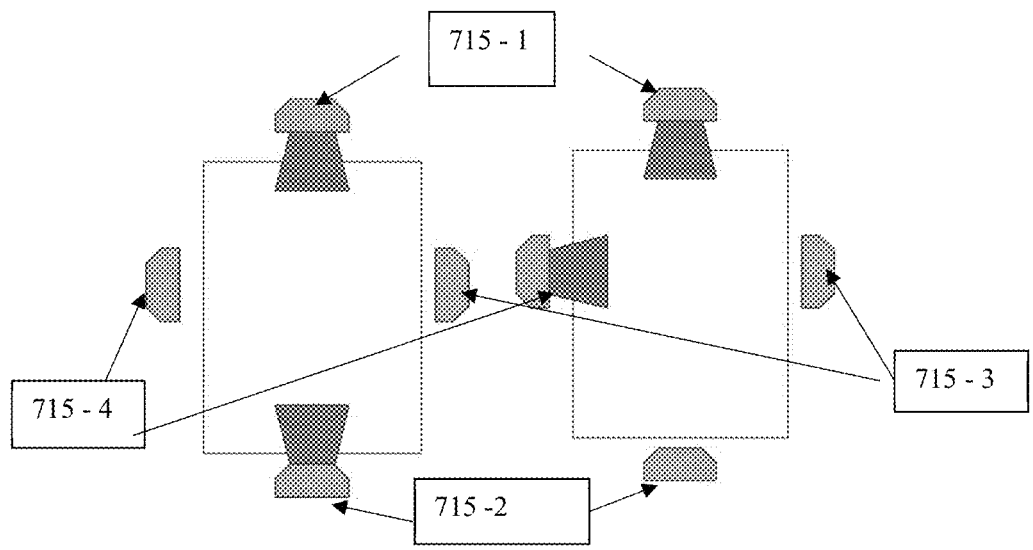
FIG. 7F a view of a fully autonomous system grading area with LED light system arrangement and controls according to an embodiment of the disclosure.

In another embodiment, there will be complete systems of lights, one that will shine over the surface. FIG. 7E, five sets of LEDs point towards the sides of the card and these lights will be positioned at level in the horizontal axis. Lights 715-4 and 715-5 are a pair that are stacked vertically on top of one another. 715-4 and/or 715-5 are used to illuminate the card based on the adaptive case's position. For example, light 714-4 is in on position whenever the top surface of the card is showing and 715-5 will remain off. The other three lights 715-1, 715-2, 715-3 are placed on the other three sides of the card. The five sets of lights are used to illuminate the card to simulate different angled orientations. The simulation of different angled orientations mimics a human grader that turns a card against the light at different angles to get a better view of the condition. As shown in FIG. 7F, there are many different combinations of the lighting and angles at which these are shone for simulating an orientation. Two adjacent lights can be on at a time, or two opposing lights can be on. These lights can be turned on in a multitude of combinations.

In an embodiment, at least one set of lights are placed around a collectible that illuminates the collectible. Whether a single light moving around the collectible, or the collectible moving around a single light or set of LEDs, the aim is to have light coming from different directions and at desired angles to the camera, so that the camera is able to pick up differences to evaluate the surface condition.

Figure 8A:
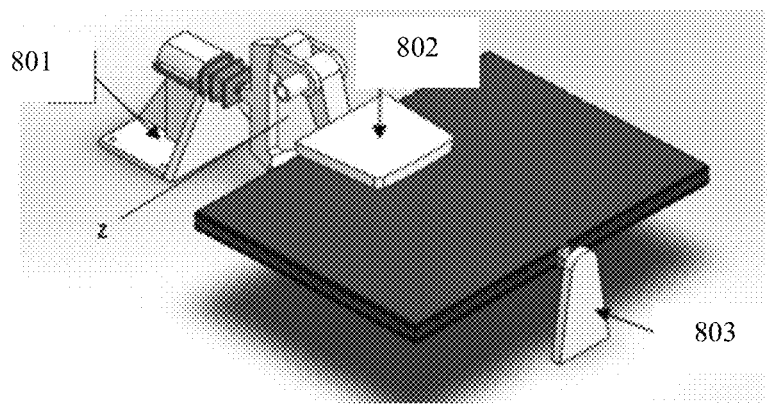
FIG. 8A is a perspective view of a mechanical card rotation subsystem of the autonomous system according to an embodiment of the disclosure.
Figure 8B:
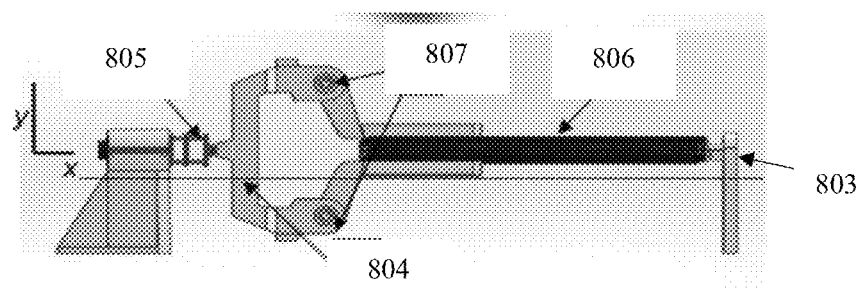
FIG. 8B is a side view of a mechanical card rotation subsystem of a autonomous system according to an embodiment of the disclosure.

FIG. 8A and FIG. 8B shows a perspective and front view of the adaptive casing according to an embodiment. It comprises a motor bracket 801, a lifting hinge 802, a pivot bracket 803, a rotating hinge 804, a DC motor 805, an adaptive case or card holder 806 and small motor 807. The adaptive case 806 comprises components that use Acrylonitrile Butadiene Styrene (ABS) plastic. The components may be 3D printed according to an embodiment. Using ABS plastic for components like hinges reduces the torque requirements for each motor, allowing the system to use less power and require less materials. This reduces vibrations that could cause image processing distortions, or unwanted card shifting. The case operates as controlled by the microprocessor that instructs the case to move when each image is captured in a different orientation. The motors provide rotational degrees of freedom.

Figure 9A:
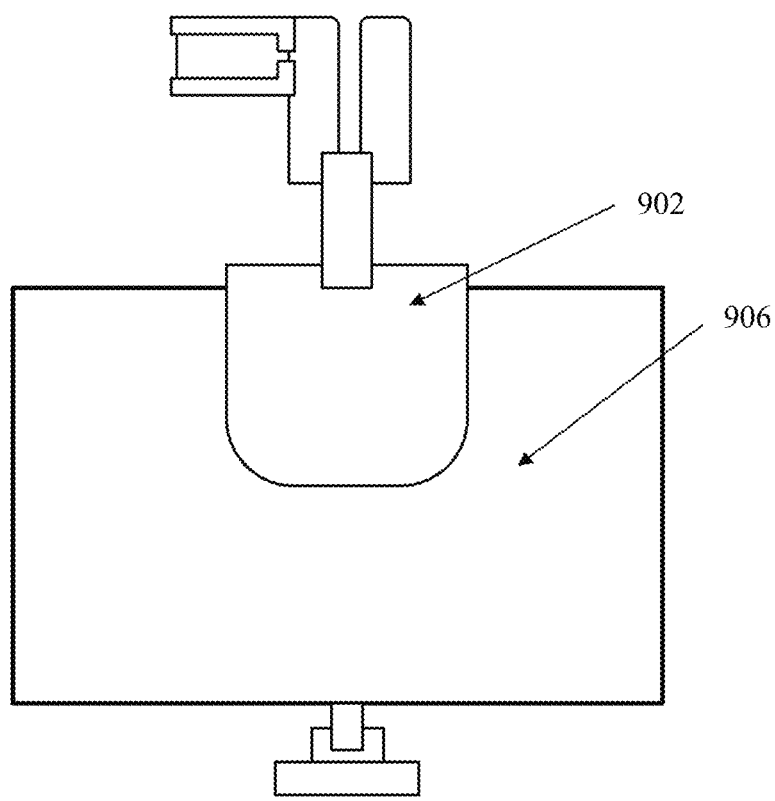
FIG. 9A is a view of an adaptive casing in closed position according to an embodiment of the disclosure.
Figure 9B:
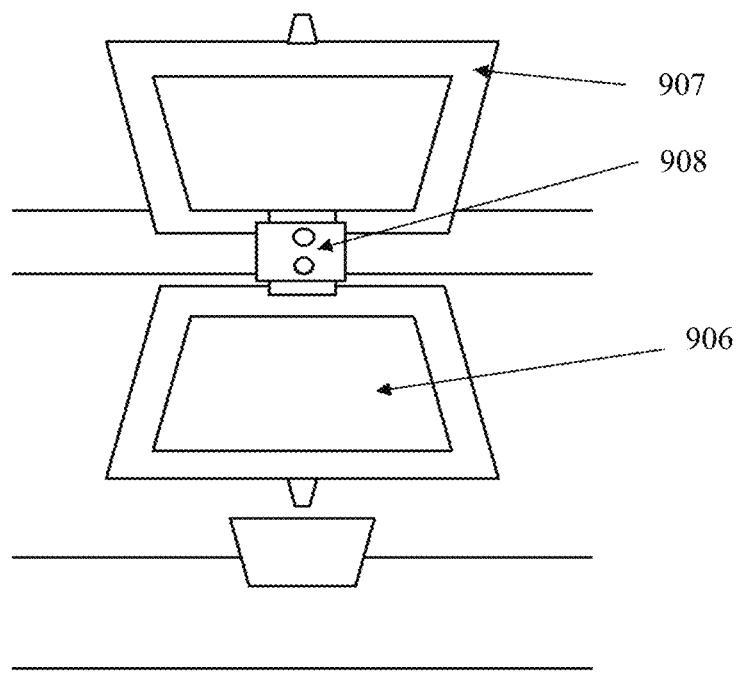
FIG. 9B is a view of an adaptive casing in open position according to an embodiment of the disclosure.
Figure 9C:
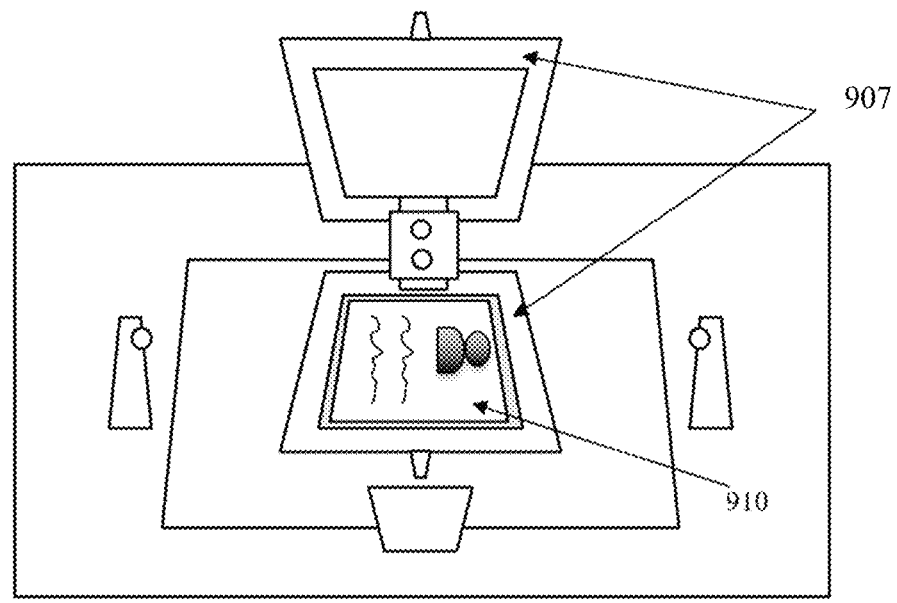
FIG. 9C is a view of an adaptive casing with a card placed according to an embodiment of the disclosure.

FIG. 9A, FIG. 9B and FIG. 9C shows different views of adaptive casing in closed, open, and open with a card placed inside the casing for the system to grade the card respectively. An operator/machine will place the card 910 and make sure the corners are within the foam border 907 and the adaptive case 906 will maintain its position through the rotation to ensure the card does not shift and protects it from getting damaged. Bracket lights 908 are placed inside the bracket that holds the case components together. There are two sets of lights placed for their ability to light the card without obstruction of the bracket itself. There are two sets located in the bracket, so when the bracket and case rotate, there will be one set of LEDs for each side of the card. The lights rotate with the case, allowing to have a set of LEDs for the front and back of the card. The casing size can be made to the size as that of the trading card or collectible. The foam border 907 can be seen on the interior face of the case as shown in FIG. 9C. The foam provides a uniform contrast for the camera that reduces the confusion caused by reflection on the Thermoplastic Polyurethane (TPU). In an embodiment, the adaptive casing uses Acrylonitrile Butadiene Styrene (ABS) for the black contrast and the motors are timed in order to ensure the card is level after each rotation. The system design has a physical stopper that limits the freedom of rotation, and the increased size of the supporting pivot bracket allows smoother transitions between opening/closing and rotations.

Card Movement System: Card movement can be a combination of translation and/or rotation. The card movement system provides a plurality of degrees of freedom in positioning and orienting the card. The card translation or orientation is controlled using electromechanical manipulation. In an embodiment, the card movement system is a card rotation system having an electromechanical rotating platform with at least one degree of rotational freedom. Card rotation system is a unique system, where a card is handled mechanically that allows both sides of the card to be shown to a single stationary sensor, which is a camera. It is similar to that of a simulation of a grading case that is used to keep the card in place. It provides a simulation of a grading slab that is not permanent, that can close and open without any damage to the card. It provides protection to the card while handling the card for different views unlike human handling. It allows the card to rotate without putting pressure on the card, which is achieved by the space in the adaptive case. The card rotation system apparatus comprises a first of a kind temporary card encasement that can open, close and rotate to any orientation in space. The temporary card encasement system referred to here as an adaptive card case or adaptive casing. The adaptive casing is designed to open and expose the card without damaging the surfaces or it can close and rotate to get the card to a specific orientation. When a card is placed in the adaptive casing, the front face of the card is exposed, and the camera would capture a set of images or a plurality of images. Then the adaptive case rotates by 180 degrees the opposite side of the card is exposed i.e., the back face of the card. Once again, the camera captures a plurality of images of the back face of the card. Similarly, under varied light conditions, a plurality of images is captured for front face, back face, all edges and all corners. All the captured images are then sent to a microprocessor e.g., Raspberry Pi® computer. The computer will then analyze the condition of corners, edges, surfaces and any alterations or manipulations done to the card. All the movements, flipping it over, and turning it around, rotating, orienting the card to any angle are all automated.

The system comprises an electromechanical rotating platform that orients the collectible in multiple positions relative to the image capturing device, a tracking system capable of tracking a position, a tilt angle of the mobile/rotating platform relative to the image capturing device.

The system further comprises a plurality of electromechanical rotating platform attached to the collectible and a second plurality of detection/sensory units attached to the electromechanical rotating platform, a third plurality of motors drives attached to the members of the electromechanical rotating platform, and a motion capture sensor.

The system comprises a camera, a laser range finder, a first plurality of optical targets attached to the collectible, a second plurality of optical targets attached to the electromechanical platform, and a local positioning system processor. The electromechanical platform further comprises a plurality of motors rotatably coupled to the electromechanical platform for omnidirectional motion. It further comprises an extendible member pivotally mounted to the electromechanical platform. The system has sensors to receive the signal for indicating the system is loaded with a trading card.

Electrical Subsystem

Figure 10A:
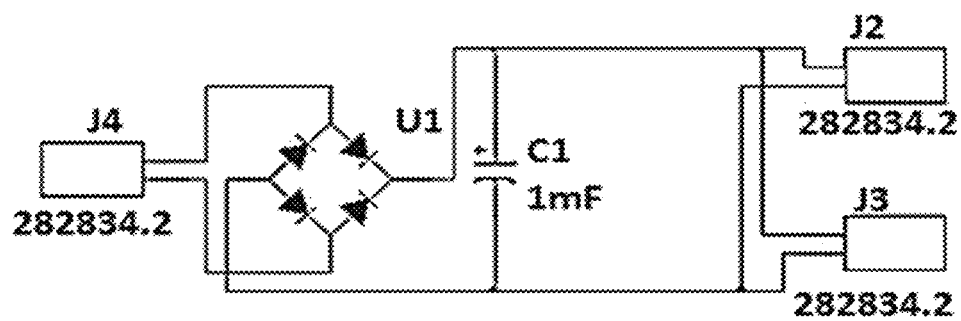
FIG. 10A is a view of a power supply design according to an embodiment of the disclosure.
Figure 10B:
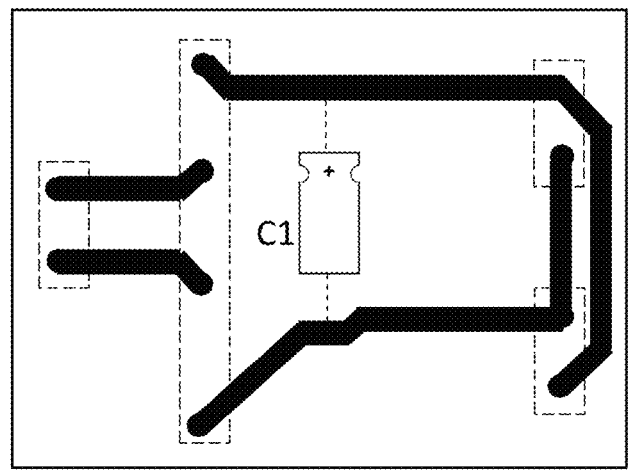
FIG. 10B is a view of a power supply Printed Circuit Board (PCB) design according to an embodiment of the disclosure.
Figure 10C:
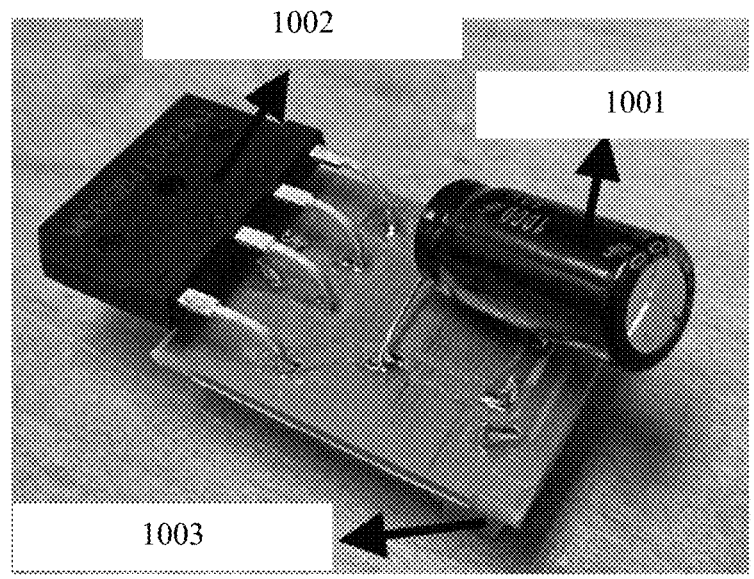
FIG. 10C is a view of a physical logic board according to an embodiment of the disclosure.

FIG. 10A and FIG. 10B shows the power supply Multisim® design and Ultiboard® Design. Multisim® is a circuit simulator and Ultiboard® is Printed Circuit Board (PCB) design and layout software that integrates seamlessly with Multisim® to accelerate PCB development. Other circuit simulators and PCB design and layout software can be used to design the circuits. In an embodiment, the power supply was designed to take in 120V Alternating Current (AC) and provide less than 4 Amps at 5 Volts with less than 100 mV of ripple to the microprocessor e.g., Raspberry Pi® and the Physical Logic Board. The tests for this system were designed to check what effect the maximum current load would have on the buck converters and what the maximum ripple voltage would be. The ripple voltage was tested first using a digital multimeter and an oscilloscope. The Direct Current (DC) voltage was recorded to ensure proper function and then the AC voltage was measured using both the oscilloscope and the digital multimeter. The ripple voltage produced by the power supply was less than ten millivolts with an average of around three millivolts. The second test checked to ensure that there would be no risk to the system due to heating of the power supply while running at maximum current. The maximum current possible with the system, but not the total current ever used, is a little less than four Amps. To test this the power supply was connected to a dummy load that would pull approximately four Amps. The temperature was checked periodically for excessive heat as defined by any uncomfortable heat as felt by the hand. The electrical subsystem never experienced excessive heat. FIG. 10C shows the physical logic board created from Ultiboard® design where a smoothing capacitor 1001, a rectifier 1002 and a screw terminal 1003 are seen. The brightness of the lights is controlled. A small dial potentiometer is being used to control the brightness and dim them to the necessary brightness.

Figure 11A:
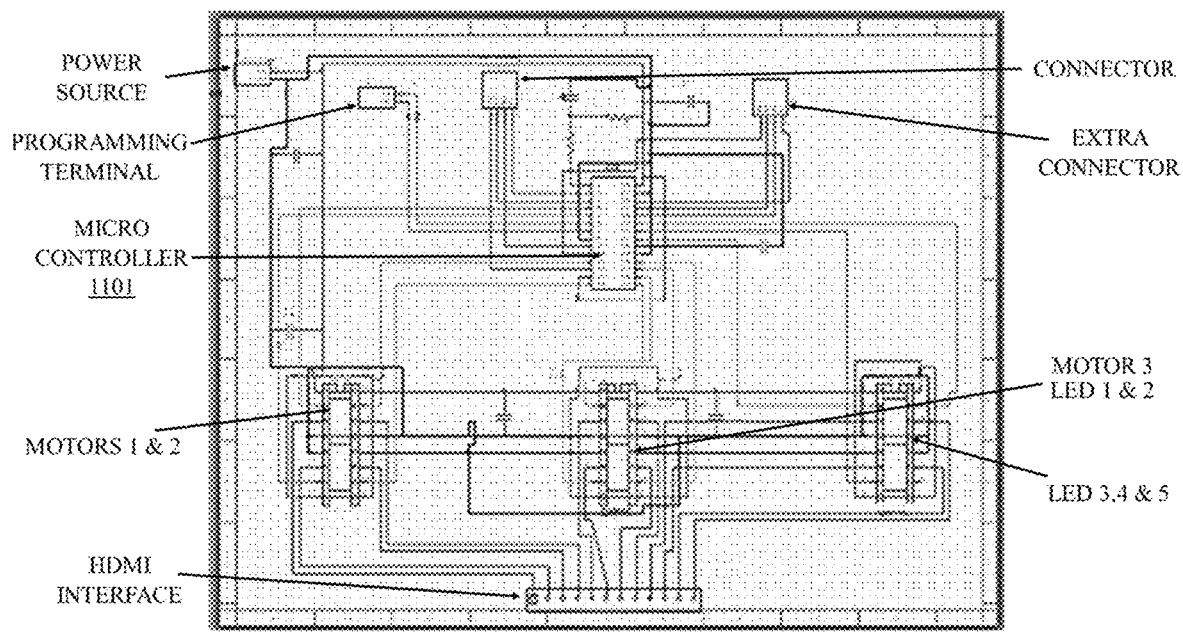
FIG. 11A is a view of a physical logic board according to an embodiment of the disclosure.
Figure 11B:
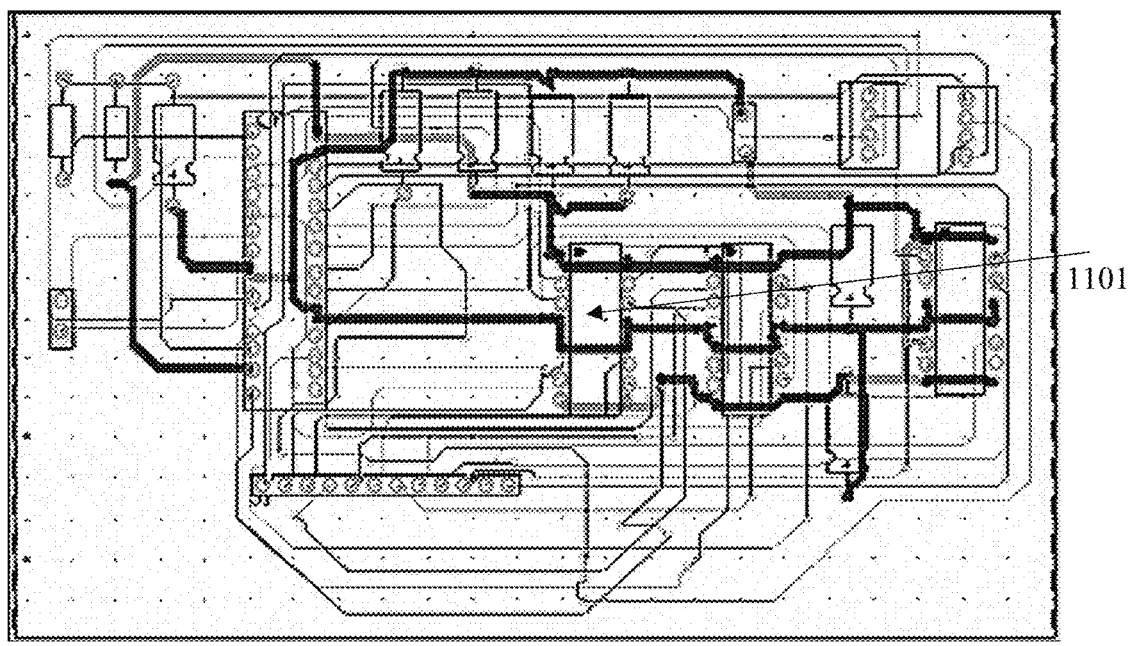
FIG. 11B is a view of a physical logic board according to an embodiment of the disclosure.
Figure 11C:
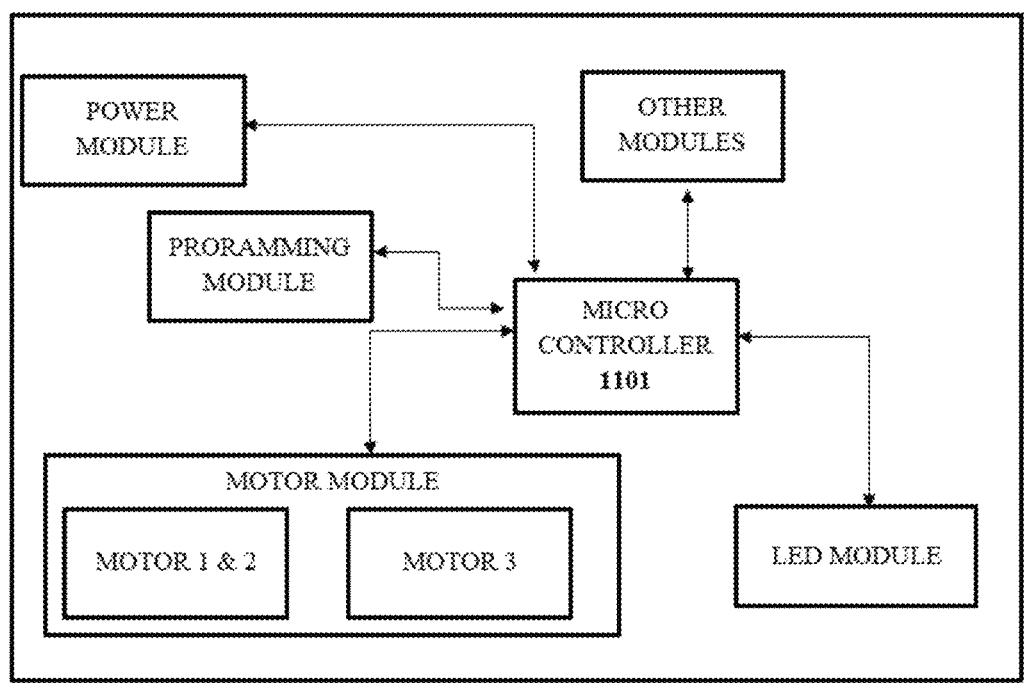
FIG. 11C is a view of a physical logic board according to an embodiment of the disclosure.
Figure 12:
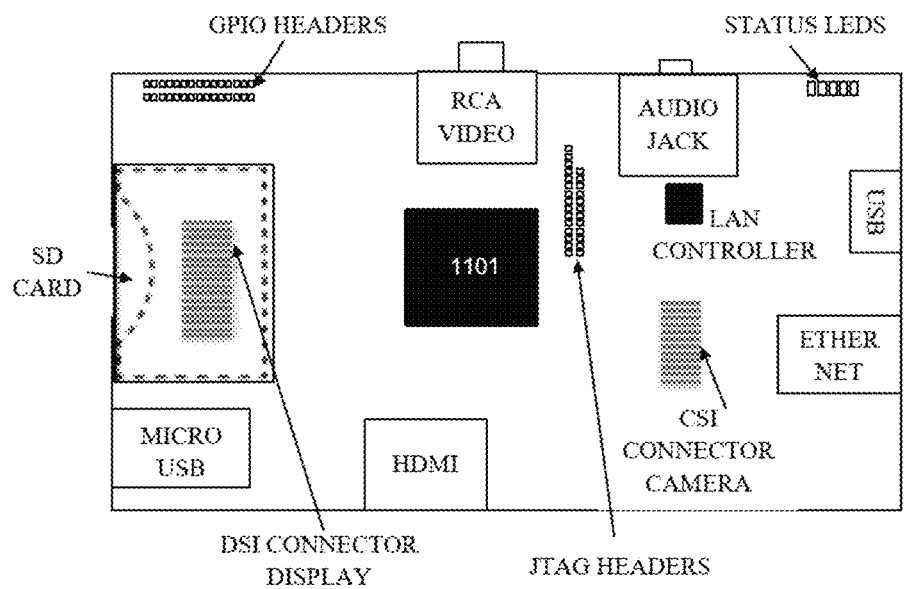
FIG. 12 is a view of a physical logic board electric subsystem according to an embodiment of the disclosure.

FIG. 11A, FIG. 11B and FIG. 11C shows the view of a physical logic board Multisim® design, Ultiboard® design and final build according to an embodiment of the disclosure. FIG. 12 is a view of a physical logic board electric subsystem according to an embodiment of the disclosure. The microprocessor e.g., Raspberry Pi® gives signals to the microcontroller to shift to the next step in the process. Microcontroller manages and coordinates all movement and lighting during the condition assessment of cards.

Internal Logic and Image Processing Subsystem

According to an embodiment, the disclosure uses an image acquisition device that can acquire one or more high resolution images of a collectible with detail that is at a higher resolution than that of the naked eye. The high-resolution images of the collectible provide an enhanced degree of detailing of the collectible than is possible with the naked eye. The image acquisition device is configured to examine the physical condition and/or characteristics of the collectible to determine if the collectible has been altered and/or modified. The one or more high resolution images are processed using one or more image processing routines for the purpose of gathering all data applicable to determining the authenticity, condition and grading of the collectible. Through the application of image processing, an analysis and evaluation of specific criteria is provided, resulting in a more consistent, repeatable, and objective grade for collectibles being established. The grading process is made through image processing techniques which comprises machine learning and deep learning techniques.

The Physical Logic board of FIG. 11A, FIG. 11B and FIG. 11C was designed to coordinate the motors, lights, and the microprocessor e.g., Raspberry Pi® needed to rotate and illuminate the card during the grading cycle. In an embodiment, the board was designed using three SN74410 H-Bridges and one dsPIC33EV64GM002 microprocessor as shown in 1101. The image processing subsystem was that the microprocessor could run through all the steps required by the microprocessor e.g., Raspberry Pi® without causing damage to the card. The image processing and internal logic subsystem deals with all the software necessary for the control of the entire system. The microprocessor e.g., Raspberry Pi® computer shown in FIG. 12 oversees being the main processing unit that communicates with the microcontroller connected to the main circuit board to carry out the entire grading cycle and other processes from the setup and the initial capture to the results being presented to the user through the graphical user interface that is shown in the touch screen display connected to the microprocessor e.g., Raspberry Pi®.

The microprocessor e.g., Raspberry Pi® communicates with the microcontroller by sending and receiving data using the General-Purpose Input/Output (GPIO) pins. A high signal output allows the microcontroller to continue to the next step of the grading process such as turning the Light Emitting Diodes (LEDs) or rotating the case. Every time the microcontroller is allowed to continue, the microprocessor e.g., Raspberry Pi® sets the output back to low and waits for the microcontroller to send a high signal meaning the task has finished.

FIG. 12 shows the connections between the microprocessor e.g., Raspberry Pi, the display, and the camera sensor. In an embodiment, the camera used can take images with a full HD resolution of 12 MP, for analyzing the images. The focal aperture of the lens allows for enough light to be perceived by the sensor and used for the captures, and it provides the correct minimum distance between the sensor and the surface of the cards for the image to stay in focus using the initially calculated distance for the camera mount of about one foot away from the horizontal surface where the cards are positioned. An external keyboard and mouse are connected to the USB ports of the microprocessor e.g., Raspberry Pi® to use an integrated development environment for Python® e.g., Thonny IDE®, built into the system of the computer. This Python® interpreter can use Python® 3.6 which is the current, fastest, and most efficient version to use with a library of programming functions mainly aimed at real-time computer vision e.g., OpenCV®.

In an embodiment, the design of the system contemplates analysis of at least two sets of images captured comprising top or front surface and bottom or back surface of the collectible, where in the images are captured under different light conditions obtained from individual and/or combination of LEDs. One LED set, according to an embodiment, comprises at least two individual LEDs aligned horizontally and connects to one circuit board and five such LED sets as shown in FIG. 7F are available for obtaining various combinations of lighting conditions. For example, LED sets 715-1, 715-2, 715-3, 715-4 can be switch on one at a time and also in combinations such as 715-1 and 715-2, 715-2 and 715-3, 715-3 and 715-4, 715-4 and 715-1 to make eight combinations, thus leading to at least 8 image captures for each of the top or front surface and bottom or back surface.

The images captured under different light conditions obtained from individual and/or combination of LEDs will be saved in a two-dimensional array. According to an embodiment, in the image processing routine of the system, each image capture represents a frame in video capture. In an embodiment, a method from a library of programming functions mainly aimed at real-time computer vision e.g., cv2.videoCapture ( ) from cv2 library, is used where the images captured are saved in an array, for example NumPy array, that stores values for each of the pixels in the image as determined by the resolution of the camera, and not the display resolution. Later, each of these captures is saved in a three-dimensional array to facilitate comparison of the captured images.

Figure 13:
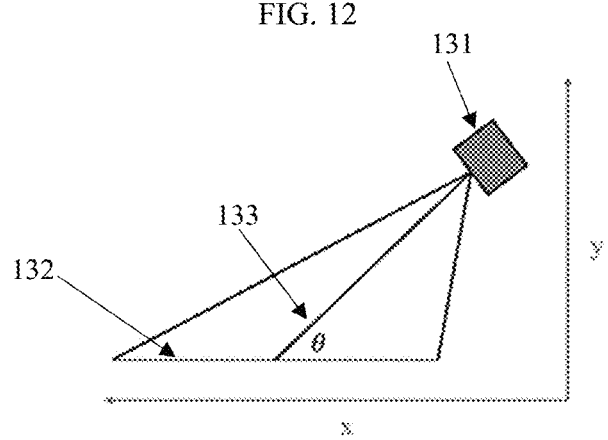
FIG. 13 is a view of an LED set angle and position according to an embodiment of the disclosure.

Each of the LED sets is positioned and oriented to a specified angle, an angle of maximum even light distribution over the given area, so that the light ray vector from all of the five LED sets point directly to the center of the adaptive case where the card is placed. This position and orientation were calculated so the amount of light that is perceived with each light is as consistent as possible with respect to its corresponding pair. In other words, the amount of light that gets to the card with a specific set, and the angle at which it is emitted, must be equivalent to that of the opposite set. FIG. 13 shows an example representation of the position of the LED sets 131 with respect to the card 132. The angle theta, is the light ray vector 133 from the LED set pointing directly to the center of the adaptive case. According to an embodiment this is approximately 78 degrees.

In an embodiment, the system gathers raw data of the condition of the collectible that can be used to help an operator or professional grader to obtain a final grade. In another embodiment, the system gathers raw data of the condition of the collectible as well as generates a raw score or grade and provides the professional grader with both raw data and raw score or grade so that the professional grader can finalize the grading. The image processing software can be tuned based on the requirements and recommendations by the grading agency and/or the professional graders. In general, these stakeholders' inputs are towards improving the overall grading and reducing the subjectivity of the process.

Cards are graded based on the primary attributes of Centering, Corners, Edges, and Surface. The approximations for the centering of the card are one of the important aspects of the overall grading value for the condition of the collectable cards. In order to perform this, it is necessary to measure the distance from each of the four sides of the central image or drawing or design of the cards to the corresponding edges of the card itself and use these calculations to provide a grade within the standards of a 10-point grading scale with 0.5 points increments or any present increment. In an embodiment, these values obtained for the centering category are compared to a prerecorded control data given by a professional grader for system training for achieving precision in the grading process.

Figure 14A:
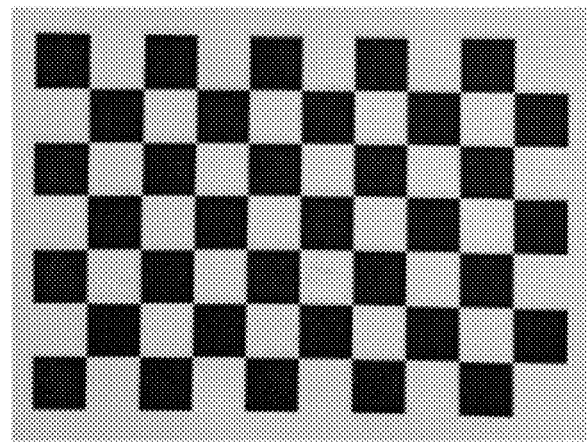
FIG. 14A is a view of a checkerboard used for distortion calibration according to an embodiment of the disclosure.

A preprocessing software is developed to remove any unwanted distortions or unwanted effects before the actual image processing is performed for assessing the card condition. In order to process the captured images correctly, it is then necessary to fix any distortion, which is called the fisheye effect. The fisheye effect creates a round zoom effect in the image, making straight lines, like the edge of the card and of the drawing, to be curved towards the outside. Both the camera sensor and the lens used with it generate a distortion in every image captured and this distortion is maximum when the lens is close to the surface of the card. A calibration software was developed using a checkerboard as shown in FIG. 14A which is of the same size as that of the card. Multiple captures from different angles and perspectives of the checkerboard were taken and used in the calibration software to fix the fisheye effect on every image, making straight lines appear straight. Calibration software sends back two arrays or matrices with the information necessary to apply transformation for every capture taken. Every image captured will pass through the calibration software to fix the fisheye effect. These images which pass through the calibration software are further processed for the condition of the card. In an embodiment, the calibration software first takes an initial capture of the front surface of the card with all the LED sets turned on. The initial capture is then passed through the calibration software and then processed using centering, corner, edge and surface detection algorithms.

Figure 14B:
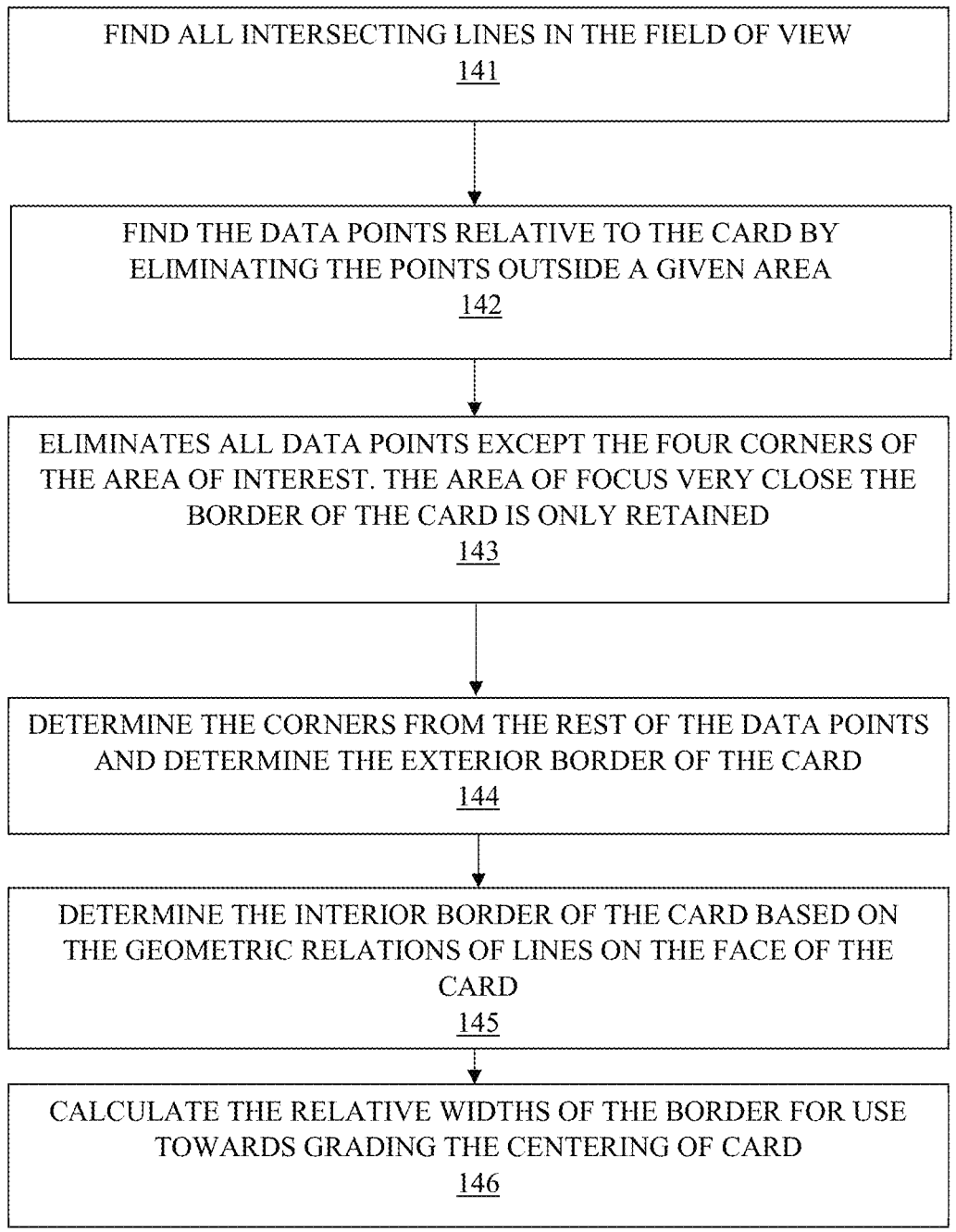
FIG. 14B is an algorithm flow chart for unwanted points elimination according to an embodiment of the disclosure.

Algorithm for Elimination of Unwanted Points: In an embodiment, the image processing software finds points of the entire field of view (FOV), thus including multiple points from the areas outside of the surface of the card, which are unwanted. These unwanted points are eliminated with an algorithm having a rectangle of reference. An algorithm for removing unwanted points is shown in FIG. 14B. The algorithms first find all intersecting lines in the field of view at step 141. The algorithm then finds the data points relative to the card by eliminating the points outside a given area at step 142. The algorithm then separates and then eliminates all data points except the four corners of the area of interest. The area of focus very close to the border of the card is only retained at step 143. The algorithm determines the corners from the rest of the data points and determines the exterior border of the card at step 144. The algorithm determines the interior border of the card based on the geometric relations of lines on the face of the card at step 145. At this point the algorithm uses the information to calculate the relative widths of the border for use towards generating the centering grade for the card at step 146.

Figure 15:
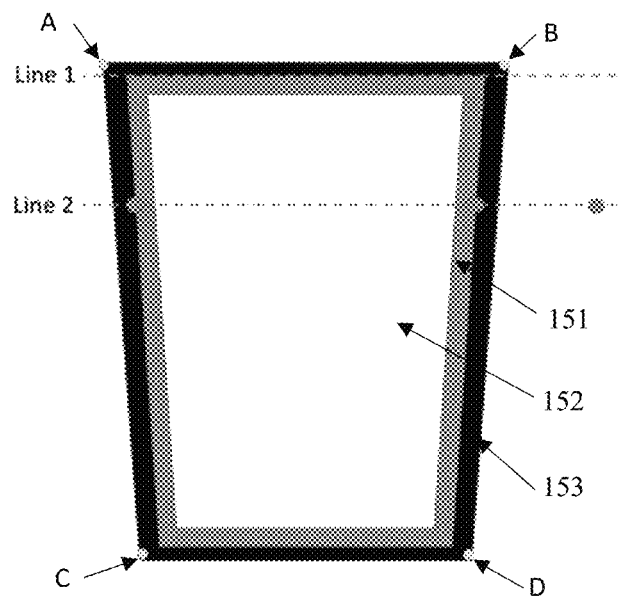
FIG. 15 is a view of a process for extra point elimination according to an embodiment of the disclosure.

In an embodiment, as shown in FIG. 15, A (upper left), B (upper right), C (lower left), and D (lower right) of the adaptive case found by the processor or set by the user is used as reference. Any point outside this reference rectangle is eliminated. The algorithm then creates four lines, AB, CD, AC, and BD. A point p of the corners is taken, then the algorithm calculates the perpendicular distance to each of the two vertical lines AC and BD, and to the two horizontal lines AB and CD. These distances are compared to the height and width of the image at that exact point p. In FIG. 15, the area 151 represents the border of the card, where all the inside the 151 border, 152, represents the design of the card or drawing. Then the border 153 is the area inside the adaptive case where the card is placed. The point to the right is the point p, this point being analyzed is used to create a line 2, that is parallel to the line 1, which is the upper border of the card. The two points of line 2 are the points of intersection between this new line and the lines AC and BD respectively. These points can be used to calculate the width of the card exactly at that point p, then compare the calculated perpendicular distances to the vertical lines, and if both distances are smaller than the width of the card at that point, then the point is inside the area described by the AC and BD lines. This process is then repeated for the horizontal lines AB and CD. This way, it is possible to know if a point is inside or outside of a set area of any quadrilateral shape. In FIG. 15, the image does not look like a perfectly straight rectangle, and this is because the distortion or the fisheye effect is normally fixed without any repercussions in the structure of the final rectangle. Depending on the position of the card, the final image may look similar to FIG. 15, although this image in the figure has been exaggerated for explanation purposes.

In another embodiment, a processor uses an image processing algorithm with machine learning aided by artificial intelligence. An edge detection algorithm is used to find the location of the player and the components of the card by segmenting the image. The image processing algorithm detects the edges, position of the player, name and all the other important information. From this information, the centering of the card and other card condition information is extracted using segmentation of the image.

Centering Algorithm: A centering algorithm is used to obtain a centering score, based on several component attributes:
 a) The centering algorithm uses the location of the corners of the card to measure the distance of the sides of the card to a printed design in the card.
 b) The points in the design used as reference are found depending on the type of card that is being analyzed.
 c) The centering is relative to the way the print is supposed to be centered, hence the reference points used to measure the distances from the borders of the card and compare how centered it is, depend on the symmetry and design of a specific card.
 d) The centering is also derived from identifying the edges or lines which are interpreted using color, saturation and brightness changes in the card images.

Figure 16:
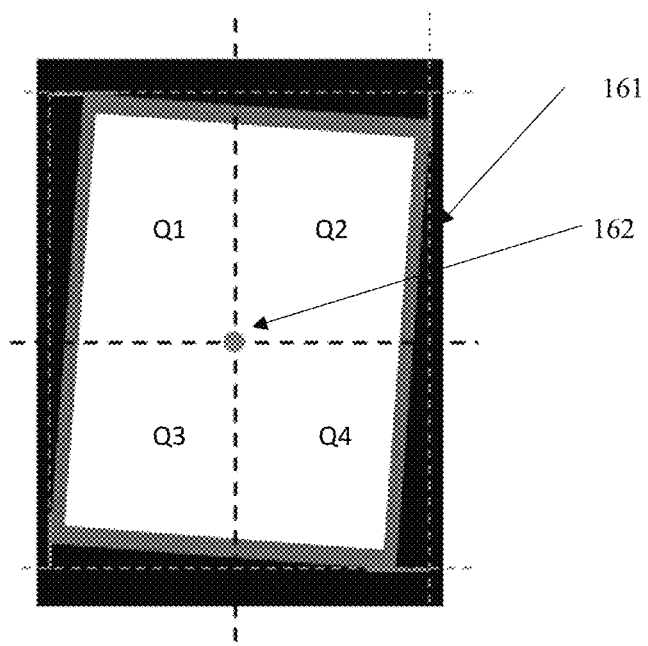
FIG. 16 is a view of finding approximate centre and quadrants according to an embodiment of the disclosure.
Figure 17:
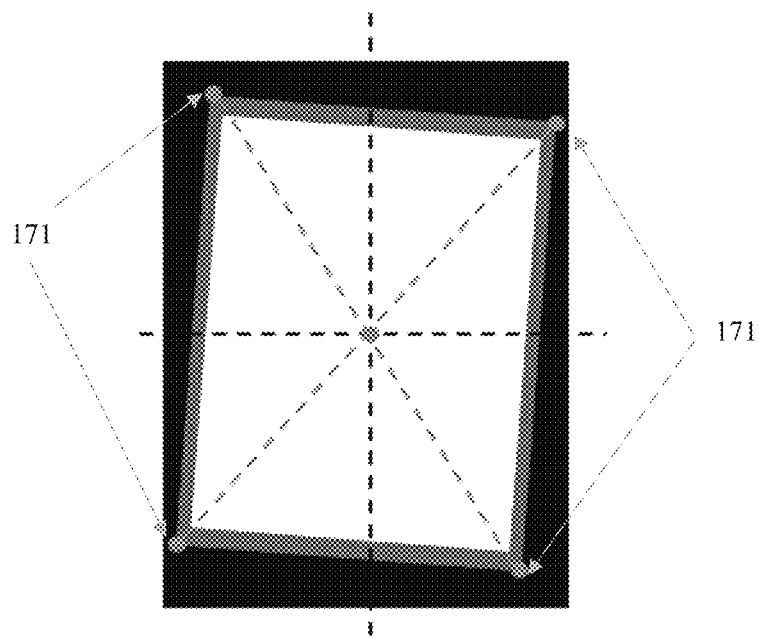
FIG. 17 is a view of finding card corners according to an embodiment of the disclosure.
Figure 18:
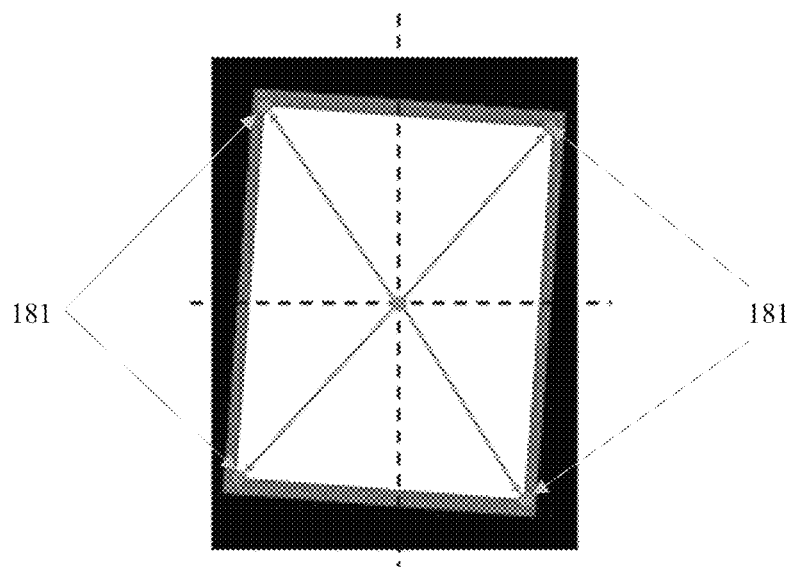
FIG. 18 is a view of finding design corners, new centre, and new quadrants according to an embodiment of the disclosure.
Figure 19:
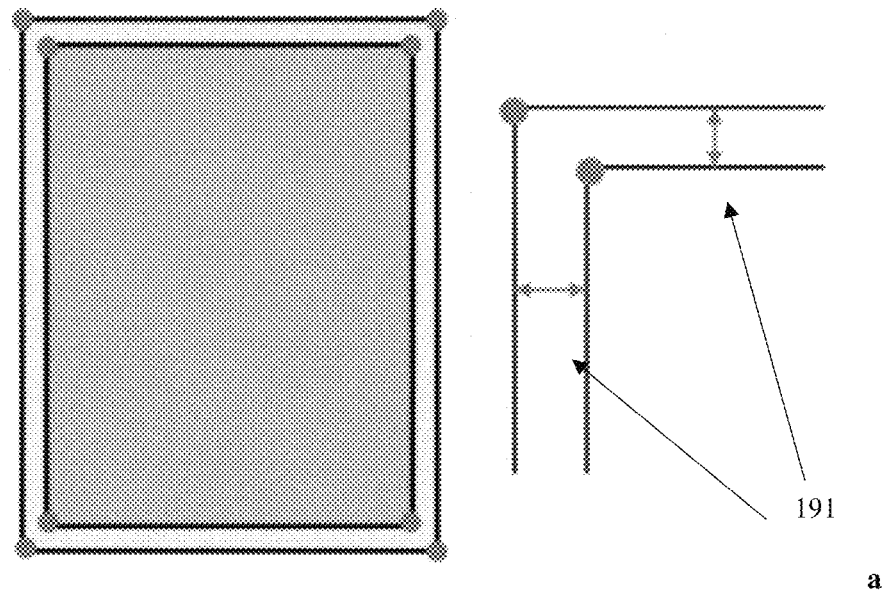
FIG. 19 is a view of a card and design corners according to an embodiment of the disclosure.

After eliminating all the unwanted points that fall outside the area of interest, the system finds the overall maximum and minimum values for the x and y components of all the corners and approximates a center for the card, this approximation may not always be accurate and such a case is represented in FIG. 16. This may happen because the card placed inside the case may have a tilt towards some direction. Since the card may not be perfectly aligned every time, the minimum and maximum values found will generate an approximate rectangle 161 shown by the grey dotted lines in FIG. 16, and an approximate center 162, which is the grey dot in the center of the image. The algorithm then uses this center to separate all the corners found into four quadrants: Q1 for upper left, Q2 upper right, Q3 lower left, and Q4 lower right. After separating the points into quadrants, now the system calculates the distances of every point to the center of the card and saves the maximum distance points as the corner of the card for each quadrant, as represented by 171 in FIG. 17. The corner point that describes the corner of the card for each of the quadrants will always be the one furthest away from the center. After finding the corners of the card itself, the process is carried out to eliminate all possible points outside of the card corners. So, the code/routine that eliminated extra/non-essential/unwanted points now uses the card corners to eliminate the data, instead of the corners of the case. This process eliminates the points of the card corners themselves. A new subroutine uses the points of card corners to create diagonal lines that cross in the center of the card. The point of intersection between the lines AD and BC is found and saved as the new center of the card. The points are saved again into quadrants using the actual center of the card as reference. Then, the process of finding the farthest point from the center is repeated, in this case, the new points will describe the points of the corners of the design of the card as observed in FIG. 18. The distances from the edges of the overall inner rectangle are measured to that of the outer one as can be observed in FIG. 19. There are eight points shown in FIG. 19. The four outer ones represent the corners of the card, and the inner ones represent the corners of the design. These eight points are used to create eight different lines, the top, bottom, left, and right edges for both the card and the design. These lines are used to calculate the centering of the card by using a subroutine that calculates the distances between two lines as depicted by 191 of FIG. 19. These distances are then translated into percentages.

According to an embodiment, the left and right distances are added, and the sum represents 100%. Then each distance itself represents a percentage of this total. A 50% for the left and 50% for the right would mean that the image of the design is centered perfectly left and right. This is also true for top and bottom. Then these four percentages are used to calculate a grade for the centering of the card. A card can be centered perfectly for left and right, but the centering in the other direction may not be as good, making the overall centering grade lower.

In an embodiment, multiple gradings for cards from a professional grader along with different rules are collected and are used to determine the quality of the centering of the card. A software module has been developed that uses the distances and percentages of the centering as inputs and calculates and provides a grade autonomously. The values obtained using the centering algorithm, during the learning phase, are compared to the manually measured distances. In an embodiment, the analysis of the centering will be carried out on the front face of the card whose image is captured with all the LED lights turned on. The software routines can be configured to any guidelines as may be provided by the professional.

In an embodiment, these edges or lines are interpreted using color, saturation and brightness changes. A plurality of images are captured for the front surface of the card using combinations of LEDs 715-1, 715-2, 715-3 and 715-4 or 715-5 as shown in FIG. 7E and are used for calculating the centering of the card. After the images are captured, an image processing software will take the captures with all the lights turned on, of the front surface and back surface of the card and finds the corners of the image. Corners are defined in this case as intersections of lines. These lines are interpreted using color, saturation and brightness changes. The data for the corners is stored in the form of a 2-dimensional array. The four points representing the corners or limits of the case where the card is placed will be used to eliminate unwanted data or areas which are of no interest as explained in the previous paragraph. The algorithm analyzes the centering for cards with a rectangle or square around the drawing of the card according to an embodiment. It is configurable to any future implementation for different types of cards depending on the shape to be analyzed.

In another embodiment, the algorithm finds symmetry in the image and analyzes the centering of the card by taking the outermost points that are part of the symmetry. After such inner design points are found, measurements are taken for the top, bottom, left and right distances of said point to the outside lines described by the card corners. These measurements are transformed into percentages for each corresponding side. Then, the percentages are used to carry out the analysis of the centering grade.

In another embodiment, a processor using an image processing algorithm with machine learning aided by artificial intelligence. An edge detection algorithm is used to find the location of the player and the components of the card by segmenting the image. The image processing algorithm detects the edges, position of the player, name and all the other important information. From this information, the centering of the card is extracted using segmentation of the image.

According to an embodiment, the standard grade for the centering is described as tolerances for every 0.5 increment in the 10-point scale. The tolerances can be of two types. One for the average of the top and bottom, and left and right pairs, and the other for the absolute values of the difference of the values of the two pairs, in other words, the deviation of the values for both pairs. These specific tolerances for the 0.5 increments can be adjusted for as per the customer's requirement and the customer/operators can plug in the values at the beginning of a setup process of the device or system.

Corner Algorithm: A corner algorithm measures several visual attributes whose combination will yield an accurate estimate of the corner score for each of the card's four corners. The algorithm finds the image attributes as below to arrive at the corner condition:
  a) Analyzing color, saturation and brightness changes in the captured image of the corner with respect to the rest of the card to detect bends and separation or peeling of the card at the corners.
  b) The device looks at the card from an edge or corner perspective to look at defects to the corners such as residual, filling, fray and discoloration.

Sharpness of the corner, an angle to each of the corner's perpendicular edges, and the nearness to a sharp right angle (90 degrees) produces the corner-shape attribute: the closer to 90 degrees, the higher the score. Residual card stock finds the missing parts of the corner or how close the edge of the card stock comes to the mathematical lines that define the corner. Filling of the corners measures the extent to which the card stock is present throughout the mathematical lines that define the corner. Fraying of corners measures the fall-off in the card stock near the corner.

The sharpness of the corner can be used to detect missing components of the corner. The image is analyzed for color, brightness and the saturation at the corners and the changes with respect to the rest of the edge. If the color or brightness is not continuous then the corner or edge condition is not perfect. If there is a change in color, it means that the corner may be bent, or it may indicate some problem with the corner. Thus, measuring the changes in color, brightness and saturation of the corner can provide information about the corner condition. A corner algorithm logic can be extended to an edge algorithm as well.

Looking at the card to see the top surface or face side only allows the computer to process the image captured from the top and it is important to look at the card from the sides or edges as well for defects. The device looks at the card from an edge perspective to look at defects in the edges and corners. The most important aspect to look for is the separation of the paper, not only of the corners, but also of the sides of the card. In an embodiment, the light will be at the same level of the edge of the card, i.e., the light will be normal to the edge. A light is shone, normal to the edges and normal to the corner at a diagonal angle from the top perspective of the card, to analyze if and where the card is peeling up. If there is any type of shadow that is being cast over the surface, which can be captured by a camera placed relative to the card and the light, it can indicate that the corner may have been lifted or peeling into two parts. Images are captured from both the top and side perspectives for this analysis.

Figure 20:
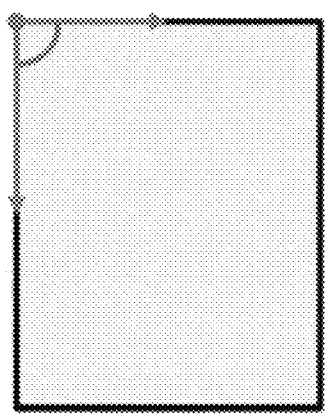
FIG. 20 is a view of a card corner straightness according to an embodiment of the disclosure.

The process of capturing the images is performed for the front and back of the card. After all images are captured, the image processing software will take the two captures of the front and back with all the lights turned on and find the corners present in the image. Corners are defined in this case as intersections of lines. These lines are interpreted using color, saturation and brightness changes. The objective of this analysis of the corners was to be able to determine how straight the corners of the cards are. This also relates to the analysis of the condition of the corners in case they are bent or part of them is missing. An angle between two vector lines around the four corners of the cards was calculated and compared to manual measurements. The device is calibrated to minimize the deviation between the actual measurements and the device measured angle. FIG. 20 is shown with corner connected lines for reference. The data for the corners is stored in the form of a 2-dimensional array. The camera captured image is fixed for distortion before proceeding for corner/centering algorithm implementation.

Figure 21A:
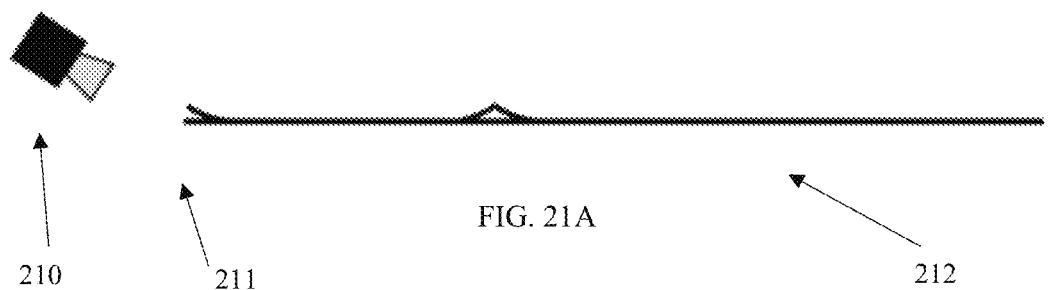
FIG. 21A is a view of a card corner by the camera towards the edge side and at an angle to the face of the card according to an embodiment of the disclosure.
Figure 21B:
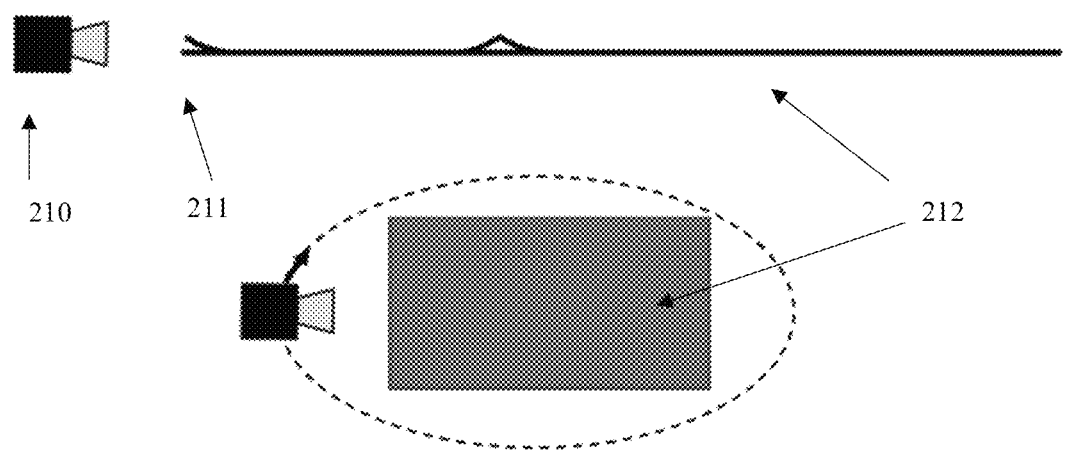
FIG. 21B is a view of a card corner by the camera towards the edge side of the card and perpendicular to the front/back faces according to an embodiment of the disclosure.

A camera is employed at a desired orientation as shown in FIG. 21A, camera being normal to the edge, to capture the edge side view of the card. In another embodiment, a camera is rotated as shown in FIG. 21B to capture all four side views of the edges and the edge condition is analyzed. FIG. 21B shows the camera 210 looking at a card 212 normal to the bent side or corner 211. The camera positions are chosen relative to the light to capture the desired condition.

In an embodiment, a neural network comprising a deep convolutional neural network is used for corner and edge detection. Detecting the corners comprises detecting straight-line segments in the captured image according to, or based on, a pattern recognition algorithm. It further comprises training the neural network to detect the straight-line segments in the captured image.

Edge Algorithm: An edge algorithm measures several visual attributes whose combination will yield an accurate estimate of the edge score for each of the card's four edges:
  a) Analyzing color, saturation and brightness changes in the captured image of the corner with respect to the rest of the card to detect bends and separation or peeling of the card at the edges.

b) The device looks at the card from an edge or corner perspective to look at defects in the edges such as residual, filling, fray and discoloration.

The device looks at the card from an edge perspective to look at defects in the edges such as residual, fray, discoloration by analyzing color, saturation and brightness changes in the captured images. The most important aspect they look for is the separation of the paper, not only of the corners, but also of the sides of the card. In an embodiment, a camera 210 is employed at the desired orientation as shown in FIG. 21A to capture the edge side view of the card 212. In another embodiment, a camera is rotated as shown in FIG. 21B to capture all four side views of the edges and the edge condition is analyzed. FIG. 21B shows the camera 210 looking at a card 212 from an angle parallel to the bent side or corner 211. The camera positions are chosen relative to the light to capture the desired condition.

In an embodiment the system measures light diffraction from an edge or surface defect and measures peaks and valleys on the edge indicating extrusions or indents on the edge relative to a straight line fitted on the edge or as with surface defects with high precision measurement of the degree (length and area) of light diffusion by number of pixels or other area measurement. Mixing Red, Green and Blue to form millions of colors and shades of similar colors creates the color palette from which all colors are derived. The system may, for example, utilize 256 different reds, 256 different blues and 256 different greens (the known color palette) to create the entire color palette of 16,777,216 different colors. With the use of highly sensitive lenses and resolution, individual pixels can be measured and any change in color can be identified and measured. Any scratch or blemish may be identified and measured for length, width, area (in pixels for example) and location on the collectible. Light may be directed at the collectible from above and the computerized system identifies and measures the increase or decrease in the surface of the collectible thus identifying depression in the surface, pressing of materials, a wave on the surface, and/or altering of the paper stock within the collectible etc.

According to an embodiment, an image processing line detection algorithm is used that takes a collection of n edge points and finds all the lines on which these edge points lie. The most popular line detectors, for e.g., the Hough transform, and convolution-based techniques are used in an embodiment.

The edge and corner detection algorithms employ similar light conditions, relative positions of light and camera and similar algorithms to detect the conditions of residual, fraying, bends and separation or peeling up.

Surface Defects Algorithm: Surface defects comprises bends, tears, stains, scratches, discolorations, cuts, color fading, alterations, re-coloring, bleaching of image and/or card, chips, dents, added color to fill in areas of defect, printing errors, the effects of bleaching, stain removal, the addition of material (i.e., paper stock) or other material and image removal for the purpose of altering the width of the collectible's borders to re-center the collectible.

The image data captured by the cameras of the trading card or collectible are scanned for a specific condition. Examples include but not limited to detection of possible surface defects such as bends, tears, stains, scratches, discolorations, cuts, color fading, alterations, re-coloring, other alterations like bleaching of image and/or card, chips, dents etc. In an embodiment, defect detection is based on relatively simple and fast computations and is sometimes used for finding smaller regions of interesting image data which can be further analyzed by more computationally demanding techniques to produce a correct interpretation. In an embodiment, Convolutional Neural Networks (CNNs) are used for surface defect detection.

Composite Image Analysis: The images are captured from different lighting conditions. These conditions provide different shades of shadows, or possible stretches. Basically, depending on the lighting, in one image stretches are seen and in the other lighting this may be seen in different orientations. An average of the captured images is computed, and the algorithm compares the deviations of every image to the average image. The differences found are then highlighted to be surface defects. For example, if a scratch at a particular location is found in multiple images captured through the comparison in difference to the average image, then the scratch is worse than the other defects which are not highlighted in many images. The processing routine captures multiple images using varying lighting and/or lighting positions and then analyzes the surface conditions which are visible to the different lighting. In one embodiment, the processing routine compares these images captured from varying lighting for deviations to an image captured with all the lights on.

Deep Learning Techniques: Deep learning has a kind of deep neural network structure with multiple convolutions layers. By combining low-level features to form a more abstract high-level representation of attribute categories or features, the data can be better reached in abstract ways such as edge and shape to improve the effectiveness of the deep-learning algorithm. Images taken from different angles were provided to Convolutional Neural Networks (CNN) as input data. Some images were used in training and testing. The deep-learning method is also a defect-detection method that is based on image processing, which is widely used to obtain useful features in massive data. convolutional neural networks (CNNs) are a class of deep-learning neural networks that are frequently used in image classification and segmentation (pixel-wise classification) tasks. They are known for adaptability, particularly in cases where the neural network topology has many layers, which has been shown to allow them to learn low-level features (e.g., lines, edges and angles), and high-level features (e.g., curved surfaces and textures).

A method is provided for forming a neural network for detecting surface defects in trading cards and/or sports cards. The method includes providing a pre-trained deep learning network and a learning machine network, providing a set of pixelated training images of trading cards exhibiting examples of different classes of defects including surface defects, training the trainable weights of the learning machine network on the set of training images. The present invention provides a method of forming a neural network for detecting surface defects in trading cards, the method including, providing a Pre-trained Deep Learning Network (PDLN) having, in sequence, an input layer for receiving pixel values of pixelated images of objects, a set of convolutional layers, a set of fully-connected layers, and an output layer, wherein the PDLN has fixed weights and is pre-trained such that its output layer can classify the objects into different object classes and identify the locations of the objects within the images, and an Extreme Learning Machine (ELM) having, in sequence, an input layer, at least one hidden layer, and an output layer, wherein the values of the nodes of the input layer of the ELM derive from the values of the nodes of one of the convolutional layers of the PDLN, the weights from at least one of the layers of the ELM to the next layer of the ELM are trainable but the weights from at least another one of the layers of the ELM to the next layer of the ELM are fixed, and the nodes of the output layer of the ELM indicate whether a given surface defect class is displayed by a given image, providing a set of pixelated training images of trading cards exhibiting examples of different classes of defects including surface defects, the training images being labelled with the surface defect classes exhibited by their respective components such that each class of surface defects is represented by a respective subset of the training images, and each training image being divided into one or more patches which are respective sub-areas of that image and training the trainable weights of the ELM on the set of training images by inputting each patch into the input layer of the PDLN and adjusting the trainable weights on the basis of a comparison between the node values of the output layer of the ELM and the surface defect class label of the parent training image of that patch, whereby the layers of the PDLN from its input layer to its convolutional layer from which the values of the nodes of the input layer of the ELM derive, together with the layers of the ELM after the training of its trainable weights form a combined network for detecting surface defects in trading cards having an input layer which is the input layer of the PDLN and an output layer which is the output layer of the ELM.

During training, the PDLN can extract patch features, and these features can then be fed into the ELM with a class label that is set the same as that of the parent image. During subsequent use of the combined network post-training, each patch of a pixelated actual image can be fed into the combined network to determine which class of surface defect (if any) is displayed by that patch.

In another embodiment, the present invention provides a method of detecting surface defects in trading cards, the method including, providing the combined network formed by performing the method the PDLN and an ELM, providing a pixelated actual image of a trading card, the actual image being divided into one or more patches which are respective sub-areas of that image, and inputting each patch into the input layer of the combined network, and reading the corresponding node values of the output layer of the combined network to determine whether a surface defect (and preferably whether a given surface defect class) is displayed by that patch. The method may further include displaying the class and/or location of surface defects in the actual image.

A computer-implemented method of analyzing an image of a surface to detect a defect in the surface, comprising, receiving the image of the surface, processing the image using a machine learning algorithm configured to detect the defect, the machine learning algorithm comprising a convolutional neural network including at least one convolution layer and at least one max pooling layer, and displaying the image with location of the defect being indicated if determined to be present by the convolutional neural network.

Image processing uses different criteria in order to grade the sports cards. The condition assessment will normally analyze the centering of the image, straightness of the corners as well as the edges. Further, the surface defect detection module will analyze the surface effects of the card to identify, classify and report the defects.

Machine learning algorithms will have multiple modules and will be subjected to training. It comprises a database where the data is stored and compares two samples with the similar condition during the learning or training phase. The more samples, the better the training and thus the grading output. There will be a plurality of light sources to provide light on the surface of the card that will be controlled to get various images under varied light conditions. The images are then merged and/or processed individually or in various combinations to find the defects present in the card.

Machine learning algorithm learns from the data of the card that it is grading every time through a feedback loop. The data is stored, and the information is used by the algorithm to learn. The more data, the better the system will be in analyzing the condition of the card and various classes of defects.

Learning Algorithm or Training the System: The machine learning algorithm will detect the defects or alterations made to the card. This is a major component of the grading process. The more the system learns, the clearer the condition assessment and it may even learn things that are not anticipated. Once a card is analyzed, the card condition data and grade are sent to a server cloud, which later will be used in learning the card. When the data of each of the cards that is graded is stored to the cloud, it would give the system power to take that information from different places or devices together. The system will be able to get more data to learn from or to train and provide more information for better condition assessment of the card. If the system gets trained with every single card in a set of sample cards, e.g., 2019 Topps Chrome® baseball, then every time a card is submitted for grading, the system will generate the same results. Once the system is trained, then taking a random card and grading it through the machine will get accurate and consistent grading results.

In an embodiment, the image processing algorithm is configured to be implemented by the microprocessor e.g., Raspberry Pi®. If the system needs a scale up, then servers can be used to compute over a cloud or over the internet. In an embodiment, the system uses a microprocessor e.g., Raspberry Pi®, or it can have multiple microprocessors e.g., Raspberry Pi®.

In machine learning there is a learning phase and during the learning or training phase, the system will grade a card which a professional grader has graded and learn from the grading criteria used. The professional grader will also provide the criteria used in grading along with the grade. Once the learning phase is over, the grading process of the system can grade a card, having no prior information on its defects, to produce a grade accurately along with the card's raw data of the condition. After a certain level of learning, the system can grade a one-of-a-kind card or unique card which the system never saw before and annotate that the card graded is a one-of-a-kind card or a unique card.

Supervised machine learning techniques will be used to take known inputs and outputs to make predictions on new data based on the standards or evidence presented to the system. This new input will be separated into categories for the different aspects the image processing will analyze. Classification and regression are used to generate models that will be used by the machine, which is the learning aspect. Unsupervised learning will be used for pattern recognition. This will be helpful for the object detection and image segmentation techniques implemented in the image processing software.

The system will receive multiple sets of cards, a set would be cards from the same type and year. This ensures that the processing routines work with equivalent data. It will be necessary to create a category for every new set, to ensure both types of machine learning algorithms, supervised and unsupervised learning, will be implemented. An Artificial Intelligence (AI) algorithm can analyze any card from a set and interpret the data obtained from the card. The interpretation of any card within a set is the artificial intelligence component itself. The system will be able to read or scan the card and provide relevant information for the categories of the grading for centering, edges, corners, and surface defects.

Image processing algorithm is computer implemented for collecting data from a collectible wherein the process comprises taking a plurality of images of the collectible. The collectible is loaded and is oriented mechanically and fully automatically so that all views are exposed to an image capturing device which is a camera. It then generates raw data of the condition, using which a raw grade result for the collectible is obtained using a designated algorithm in a computer system. Processing the raw grade for the collectible with a computer system comprises collecting metrics for centering of an image on the collectible, corner condition, straightness of the edges and identifying possible areas on the surface of the collectible where physical damage may be present. These potentially damaged areas data is then shown to the operator. The raw data of the condition of the collectible can alternatively be provided to the professional grader along with the raw grade result. The computer uses at least one processor to evaluate the collectible with a scoring equation with the computer system for generating a raw grade.

Image processing system comprises at least one non-transitory computer-readable storage medium storing processor-executable instructions that, when executed by at least one processor, cause the at least one processor to obtain at least one still image of a collectible captured by an image capturing device and identify at least one physical feature of the collectible in the captured image using an automated image processing technique. Physical feature here refers to a feature related to the card such as centering, edge, corner or surface. The processor is configured to overlay at least one still image of the collectible from the image capturing device to form a composite image. Identify at least one physical parameter of the collectible using the data catalog stored in the image processing device. A physical parameter is the condition of the card including condition or metrics related to centering, edge, corner or surface. A data catalog is a collection of metadata, combined with data management and search tools, that helps analysts and other data users to find the data that they need, serves as an inventory of available data, and provides information to evaluate fitness data for intended uses.

In one embodiment, the processor would obtain at least one still image of a collectible and identify at least one physical feature of the collectible at least in part by analyzing the composite images using a deep learning technique. The processor is further configured to identify the at least one physical feature of the collectible at least in part by providing the composite images as an input to a multi-layer neural network. The processor is further configured to identify the at least one physical feature of the collectible at least in part by analyzing the composite images from an iterative and collective data catalog.

In another embodiment, the processor is configured to identify the at least one physical feature of the collectible at least in part by using the multi-layer neural network to obtain an output that is indicative of the at least one physical feature of the collectible in the composite image. The processor is further configured to display the composite image to the operator.

Overall Grading Routine or Grade Generation

Figure 22:
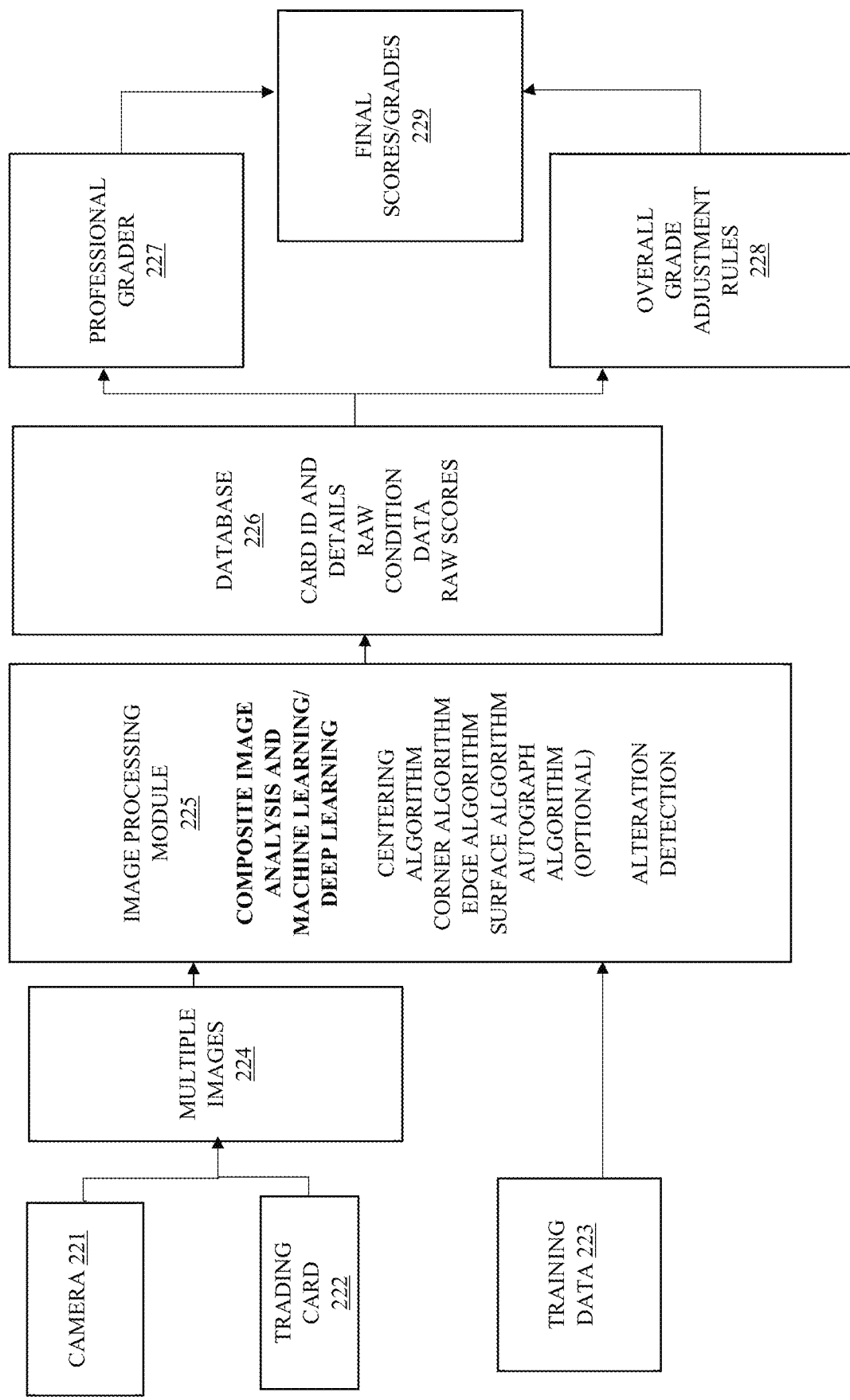
FIG. 22 is a view of the overall grading algorithm/process according to an embodiment of the disclosure.

In an embodiment, the overall grading implementation algorithm for a card is shown in FIG. 22. A camera at 221 captures multiple views of a trading card at 222 and a plurality of images are generated at 224. An image processing module at 225 comprises different algorithms for generating condition data about centering, corners, edges, surface and autographs (if any). Several cards' data with known conditions and scores are used as training data at 223 to train the image processing module at 225. Each of the images captured, their id, along with raw data of the condition and raw grades or scores is stored in a database at 226. The database can be local or on the cloud. These raw grades generated are adjusted based on overall grade adjustment rules at 228 to generate a final grade/score at 229. In an alternate embodiment, the raw data of the condition and the raw scores are given to a professional grader to generate the final scores at 229. According to an embodiment, the data of the collectible comprises name of a player or character on the face of the card, grade, company name, detailed annotated report, place of review, condition feedback, recording, possible background checking, and digital review, and is stored to a database.

A card receives a grade as a combination of four values obtained for each of four categories of centering, corners, edges, and surface. The overall grade depends on these four values. The companies that grade cards have scale standards that incorporate rules for the calculation of the overall grading of a card, as well as weighted percentages for each category. This information is maintained secret or proprietary, and it is difficult to know exactly how these companies implement the grading scale, but by using a system of equations it is possible to approximate a formula that can be implemented along with the overall grade adjustment rules to obtain an overall grading that stays consistent to these standards. Information for multiple cards is gathered and it is necessary for the system to analyze the grading of multiple cards by separating the grading into the four categories, then comparing the individual values to the overall grading of each card. This way it was possible to incorporate variables for the possible percentages each category was receiving. Then, using systems of equations it was possible to find these percentages. These values can take the individual grading of the four categories and output an accurate final grade.

In another embodiment, the system is capable of receiving the grading values, from 0 to 10 with 0.5 increments, for the centering, corners, edges and surface. Then, it is capable of providing an overall final grade by multiplying percentage weights to each of the categories. In an embodiment, the scoring equation percentages considered are 38% for centering, 22% for corners, 15% for edges, and 25% for surface. These values can be fine-tuned or calibrated with more and more information as being made available with the analysis of more cards. In another embodiment, these values may be unique for every client/operator/customer and are configurable to be adjustable. In another embodiment, the grading routine has a set of rules to follow for the analysis of the overall grade. For example, considering the minimum value of the 4 categories, i.e., centering, corners, edges and surface, if the values of any 3 categories out of the 4 are greater by 1.5 or more, then the overall grade can go up from the current by a maximum of 1 point irrespective of the value of the fourth category. Such rules can be incorporated or customized as desired by the clients. According to another embodiment, the grading values of centering, corners, edges, and surfaces are given a percentage weight in the overall rating and are coupled with overall grade adjustment rules derived from the know-how and experience of graders' way of grading. These overall grade adjustment rules are added to the grading routine and used in generation of a final grade. These rules are configurable as per the company's requirement. The raw grade generation equations are run through and then the overall grade adjustment rules that are appropriate to the specific knowledge are applied every single time.

Overall grade adjustment rules depend on independent factors that affect a grade. Adjustment can be considered as another word for "grading curve". If every card in a batch, manufactured by a certain company, has bent corners, frayed edges, uncentered images, etc., then these cards will be graded on a curve based on the best-known condition of that particular set of cards. An example would be a particular set of cards sold last year. The manufacturing process was flawed so all of the cards had tattered edges. However, for most cards, this would deteriorate the condition, but for this batch, since all cards exhibited the same defect, it was almost ignored by graders, and they still assign high grades for these cards. The only difference really is the value of the card. A frayed batch is worth less than a pristine cut batch. In another embodiment, if any of the four grading criteria has a value of G, but all of the other three criteria have a value greater than or equal to G+1.5, then, the final grade of the card is usually adjusted to be G+1. As an example, if the centering is 5, but the corners, edges, and surfaces received a grade of 6.5 or more, then the overall grade of that card is going to be a 6/10. These tolerances and rules are specific to the graders and companies grading the card and hence are customizable or adjustable within the device. In an embodiment, there are percentages that are used as a weight for each category of grading, that adds up to the overall grade value. These percentage weight values can be adjusted as desired. The algorithm also has a set of rules that are used to calculate the overall grading or the grading of the centering alone. For example, for centering, a measure for the left side is say the value is "L", then, one for the right, "R". The percentage of the left side would be L/(L+R)*100. For the right, R/(R+L)*100. The two percentages for a perfectly centered card will be 50%-50%. In another example, if the left and right percentages are 50-50, but the top and bottom are 53-47, this card will obtain a 9.5/10 value for the centering. These tolerances or rules can be adjusted with overall grade adjustment rules. In an embodiment, these grade adjustment rules are obtained autonomously by a processor using machine learning aided by artificial intelligence. The system will be configured to learn these overall grade adjustment rules autonomously.

Display and Graphical User Interface

Figure 23:
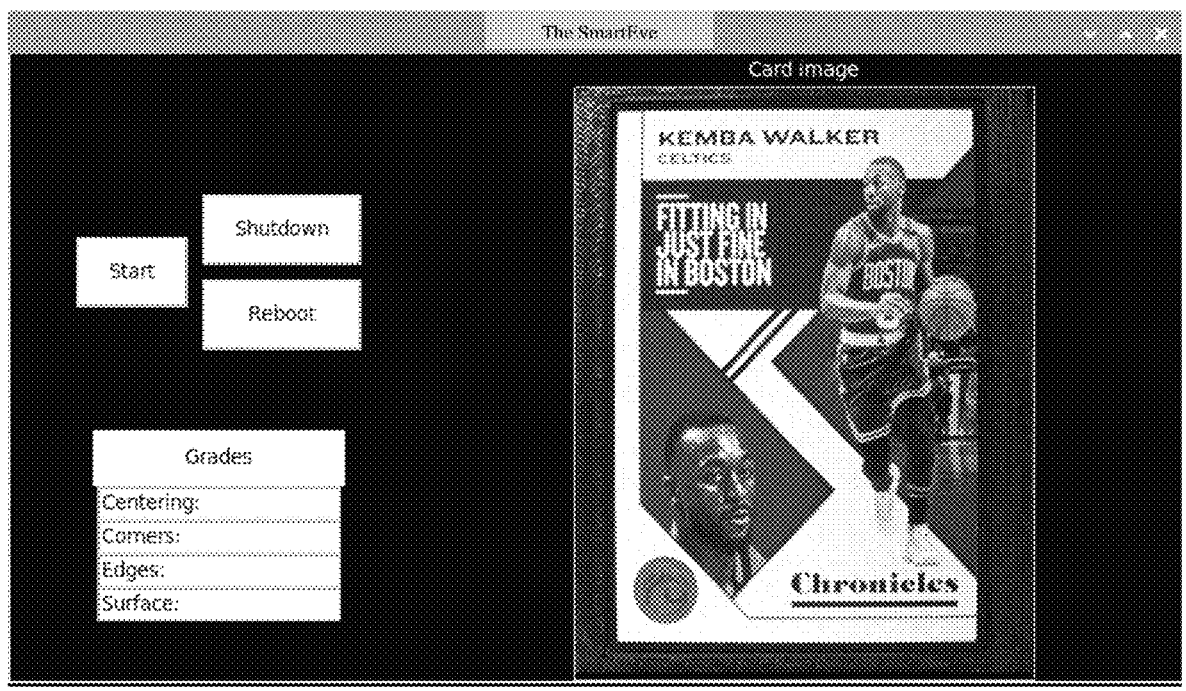
FIG. 23 is a view of the display interface according to an embodiment of the disclosure.

The user interface's window according to an embodiment is as shown in FIG. 23, has been separated into two main frames. The one on the right shows an image captured of the card being graded. The frame on the left is further separated into two more parts. The lower part shows a breakdown of the grades obtained for a card by each of the section's scores for centering, corners, edges and surfaces. The upper part is provided with three control buttons, namely, a start button, a shutdown button, and a reboot button. These buttons generate function calls when pressed. The program will begin to analyze the cards' condition right after the start button is pressed, and the user interface will display the results after this image processing is finished. In an embodiment, a 7-inch display is being used with a microprocessor e.g., Raspberry Pi. The GUI that is built for the system is initialized at the beginning of the .py script of the main program, so the code for the user interface is saved in the file with the rest of the code. A .py script is a python file that can be used to be run at the beginning, whenever the computer (e.g., Raspberry Pi®) turns on. The implementation for the user interface is simple, the operator will turn the microprocessor e.g., Raspberry Pi® on along with the rest of the system by flipping the switch that allows current flow from the power supply system to the rest of the system. After turning on the user interface will be displayed. In an embodiment, there is a user interface in the display, to be able to start a program, read the data, look into the data and take it out of the system. If there are not enough samples of the card, there will be alerts or warnings about not enough, not sufficient data. In the areas of the card, where there might be some detected manipulations or problems such as air scratches, these areas are highlighted on the display. In an embodiment, the processor uses machine learning aided by artificial intelligence.

Machine learning needs a minimum number of samples, in other words, a minimum number of cards must be scanned for the algorithm to have enough information to learn. The minimum can be set to be a certain number of scans depending on the type of card that is put into the system. If a card that has insufficient samples is placed to be scanned, then the user will be alerted about this issue of insufficient information. If there are not enough samples of that specific card, in other words, if not enough cards that are exactly like the one that has just been put into the system are found, then the system will either be completely unable to correctly provide results, or the results provided after the analysis may be deficient, or not as good. Hence a warning will alert the user about the situation.

There are many cases where a grade will depend on rarity or supply. The condition will be curved based on the number of cards in existence. If there are twenty identical cards/collectibles of a certain type/style/brand/name etc., the card with the best condition will be considered to have the highest grade on a 10-point or 1000-point scale or any other predefined set limit and variance. The other cards will then depend on that one card acting as a standard.

The device is also configured to recognize that there is insufficient information and can provide certain subgrades. It is configured to output the data that it is capable of at the time. For example, if it can output a centering grade, it will do so, but if there is insufficient information of the edges, it will only output a warning or an error message to alert the user. In an embodiment, there is a user interface in implementing confirmation in the display. There will be control buttons to start a program, to take out data as necessary or to look at something to save in a memory. There are also warnings about not sufficient data depending on the number of samples that the machine uses to learn. According to an embodiment, the system is configured to display the confidence level of the grade based on the number of samples used in training. There is also an area and/or button which can access plausible areas of the grade and the basis of errors is displayed. The system is also configured to generate the grade based on the data available in case there is a problem in assessing some of the classes of defects. For example, supposing the surface effects are yielding an error message then the machine can rate the sharpness and the centering etc., but not the surface defects. In such cases, the help of a human to rate the surface effects during or after the process by the machine is considered into the overall grading.

Labeling and Encapsulation of the Card

Figure 24A:
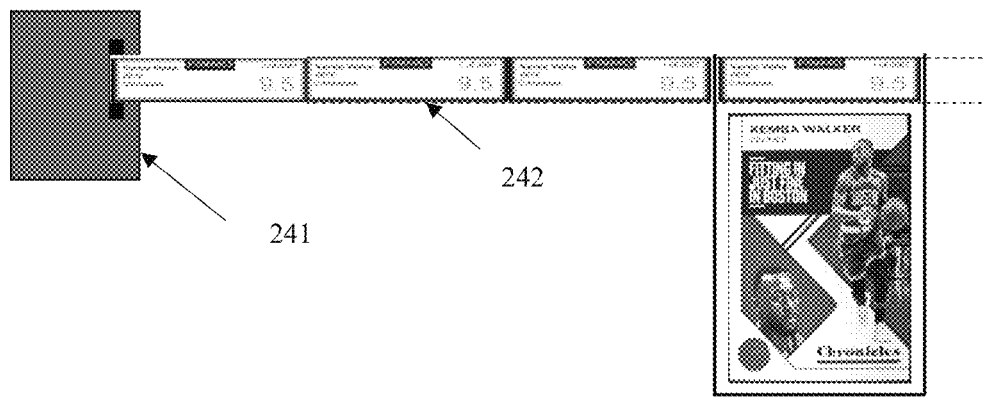
FIG. 24A is a view of a label roll with printed data being placed on a trading card according to an embodiment of the disclosure.
Figure 24B:
FIG. 24B is a view of a label with printed data according to an embodiment of the disclosure.

The collectible, within the temporary adaptive case will be moved as one object to the next step in the process through electromechanical translation such as gear track, conveyors or belt and pulley train. The case will then be opened once again and there will be another temporary case to take the previous case's place as they move from grading to stamping. The reiteration and replacement cycle of cases will be done using other electromechanical components. The tamper proof slabs will be gravity fed into the stamping area according to an embodiment. A pick and place device will take the pair, bottom and top pieces from a designated area on the system and place them in the desired position via a mechanical system in another embodiment. A mechanical extraction process will transfer the card from the temporary case to a standard tamper proof slab. The card will be translated from a grading platform to the bottom half of a permanent card case or grading case. The position of the card is face up, flat inside the bottom half of the permanent plastic case and a roll of labels 242 will be run over the slot in the slab as shown in FIG. 24A. All applicable information that is necessary to be included on a tamper proof casing, such as grade, serial numbers, Quick Response (QR) code, barcodes, company name, etc. will be electronically printed on the standard label as shown in FIG. 24B. Each label may include name of player on card, year of card print, company card originates from, known number of cards in existence (e.g., 1 of 2367), or assigned card number (e.g., #312 of 1000; #1 of 8), number grade (1-10), or letter grade (a, b, c), Quick Response (QR) code or barcode, card serial number (if applicable), grading company logo. The printer will have a guide that will place the label in the appropriate section of the slab.

Figure 25A:
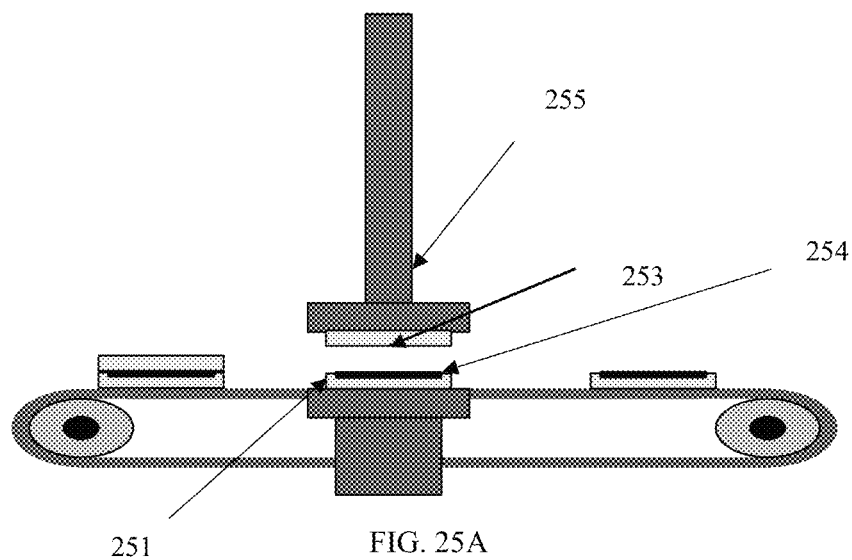
FIG. 25A is a view of a labelling and encapsulation electromechanical system with graded and encapsulated cards proceeding towards extraction area on one side and to be labelled and encapsulated cards coming towards the sonic weld system on the other side according to an embodiment of the disclosure.
Figure 25B:
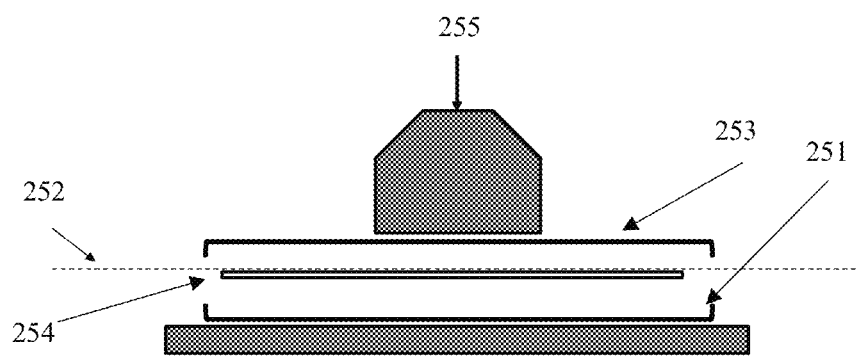
FIG. 25B is a view of a label being inserted before sonic compression begins, according to an embodiment of the disclosure.
Figure 25C:
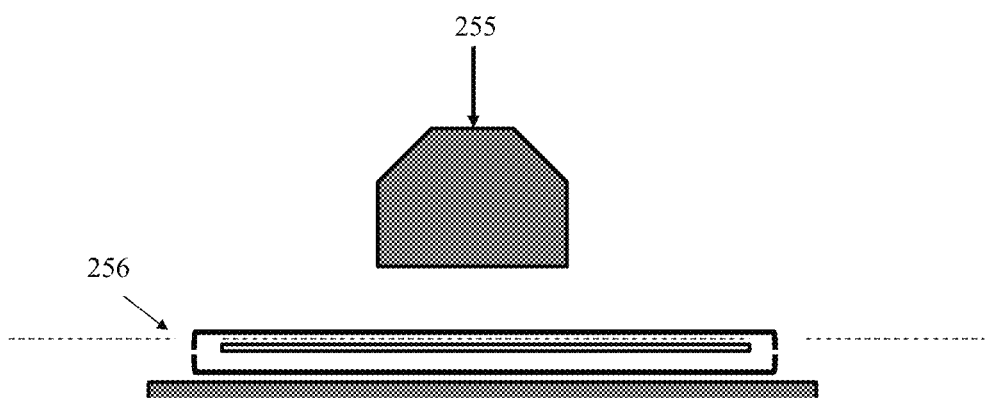
FIG. 25C is a view of sonic compression with label shear shown according to an embodiment of the disclosure.

The top half of the case 253 will be placed on the bottom half 251 with the card 254 in it as shown in FIG. 25A and FIG. 25B. As the case is closed using sonic welding 255, the heat from the vibrations and friction from the weld will shear the label off in place 261 as shown in FIG. 25C. The slabs will be sonic welded by the hydraulic, or pneumatic press. The press will stamp down the case and seal the card and label inside using standard industry sonic welding techniques as shown in 256. A force detection unit will measure the applied force of the hydraulic/pneumatic press to the slab to perform consistent and adequate seals.

Figure 26:
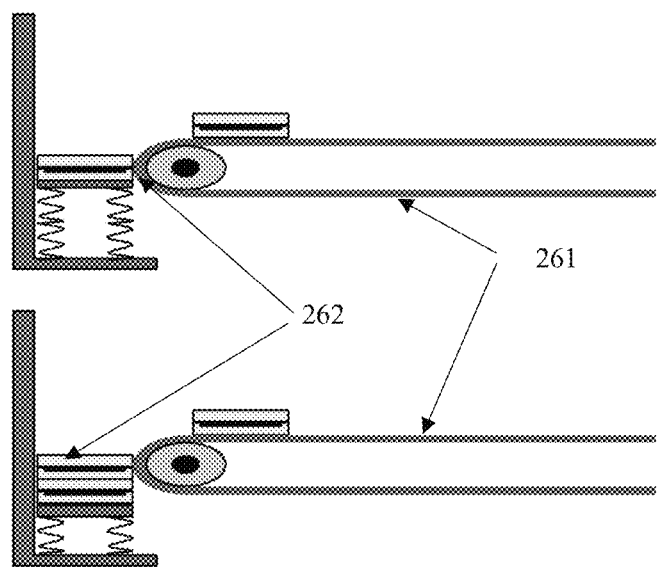
FIG. 26 is a view of a labelling and encapsulation electromechanical system with graded and encapsulated cards proceeding towards the extraction area according to an embodiment of the disclosure.

According to an embodiment, the graded and enclosed collectibles will be moved out of the designated stamping zone via the same electromechanical transportation system such as a conveyor 261 and transported to an extraction area where graded collectibles are stacked as shown at 262 of FIG. 26.

Database and Cloud Based Data Sharing

In one embodiment, multiple devices will be storing data to a cloud and sharing that data. If two devices are located at two different places, one device does a part of analysis and the other does another part of analysis, then the systems will get the benefit of both the analysis through cloud sharing of the data. If there are two devices, if a card is scanned at each device, then the data from both devices is saved. The most important factor is that the device has a new scale, a scale that can be programmed or configured into the computer. If a company like PSA® owns the machine, their skill and grading practices can be configured into the device. It is possible to configure two devices with different skills and rules of grading but can still share images.

Example Implementation and Results

Figure 27:
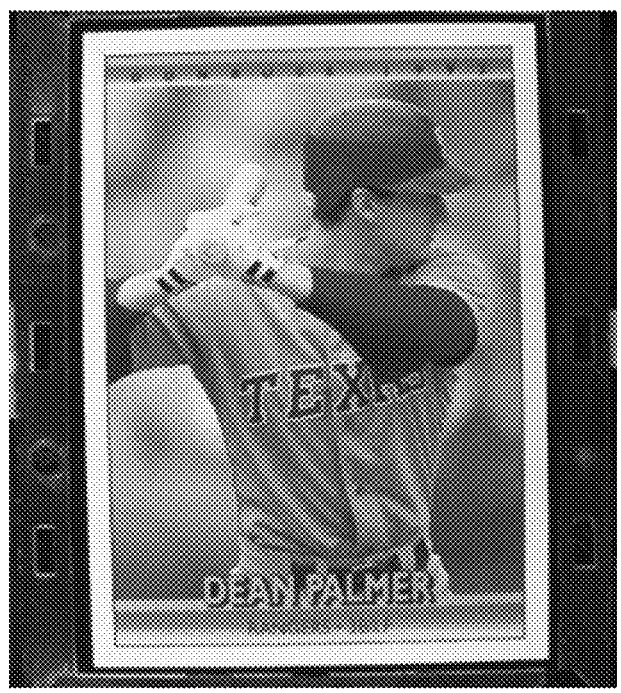
FIG. 27 is a view of an image of a sports card captured according to an embodiment of the disclosure.
Figure 28:
FIG. 28 is a view of the corner of a captured image from the camera highlighting distortion according to an embodiment of the disclosure.

FIG. 27 shows the initial capture of a card. FIG. 28 is the zoomed view of the corner of the captured card which shows the distortion, fisheye effect. The card edges do not look straight, and the rectangle around it represents the possible area or space where the card may be positioned inside the case. The system is able to find the corners of the card and of the design of the card and measure the distance of each side of the design to the edges of the sides of the card. The analysis of how centered the image in the card is accurate to the nearest micrometer.

Figure 29A:
FIG. 29A is a view of the captured image from the camera showing the unwanted areas from the field of view of the camera. Image distortion can also be observed according to an embodiment of the disclosure.
Figure 29B:
FIG. 29B is a view of the captured image from the camera after fixing the distortion according to an embodiment of the disclosure. The image is darkened on purpose to highlight the algorithm steps.
Figure 30:
FIG. 30 is a view of the captured image from the camera implementing the corner algorithm highlighting all corner points in the field of view of the camera according to an embodiment of the disclosure. The image is darkened on purpose to highlight the algorithm steps.
Figure 31:
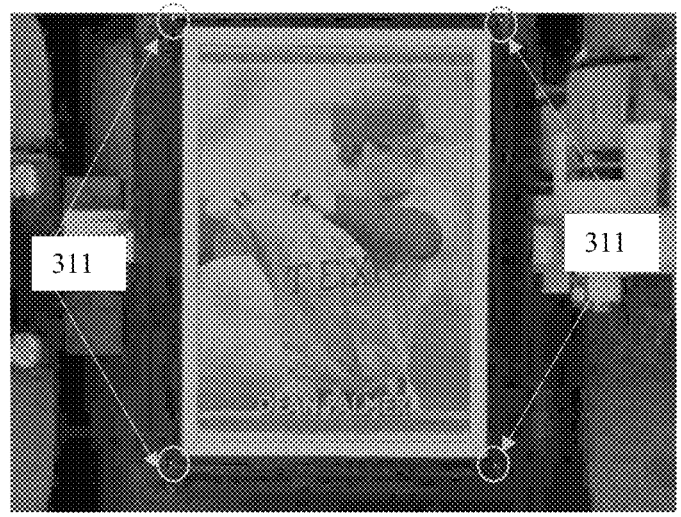
FIG. 31 is a view of the captured image from the camera implementing the corner algorithm highlighting points of the adaptive case according to an embodiment of the disclosure. The image is darkened on purpose to highlight the algorithm steps.
Figure 32:
FIG. 32 is a view of the captured image from the camera implementing the corner algorithm highlighting corner points and filtering the rest of the points to keep only relevant points according to an embodiment of the disclosure. The image is darkened on purpose to highlight the algorithm steps.
Figure 33:
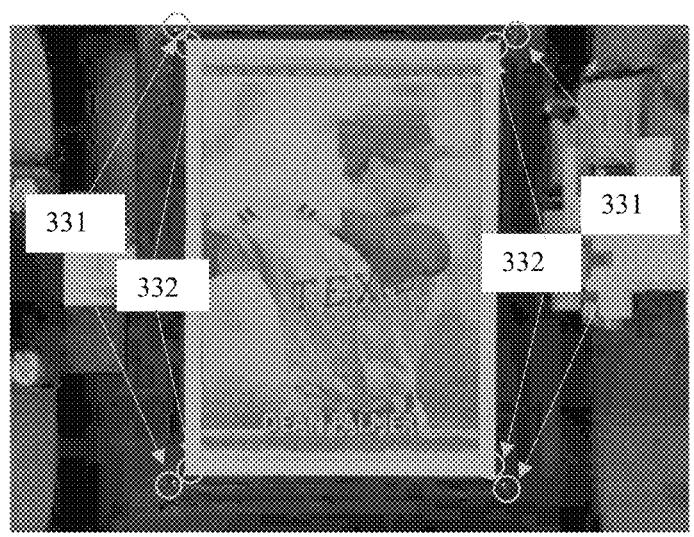
FIG. 33 is a view of the captured image from the camera implementing the corner algorithm highlighting corner points of the adaptive case and the card according to an embodiment of the disclosure. The image is darkened on purpose to highlight the algorithm steps.
Figure 34:
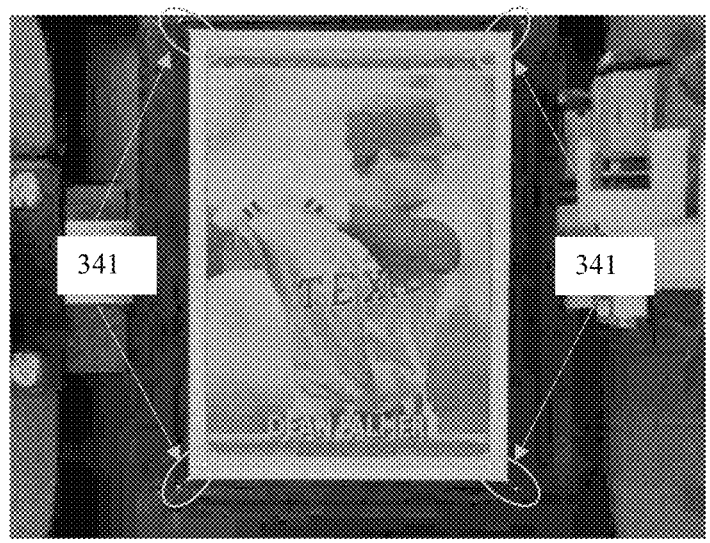
FIG. 34 is a view of the captured image from the camera implementing the corner algorithm highlighting corner points of the adaptive case, the card, and the design corners according to an embodiment of the disclosure. The image is darkened on purpose to highlight the algorithm steps.
Figure 35A:
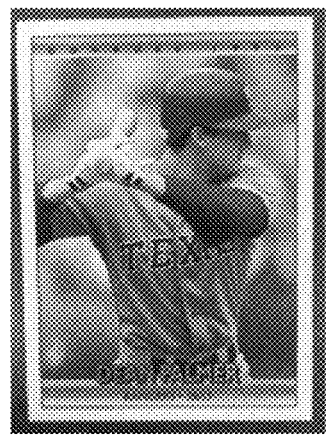
FIG. 35A to FIG. 35E is a view of the five different analyzed sample cards along with their scores with 10 repeated tests on the system for each card according to an embodiment of the disclosure.
Figure 35B:
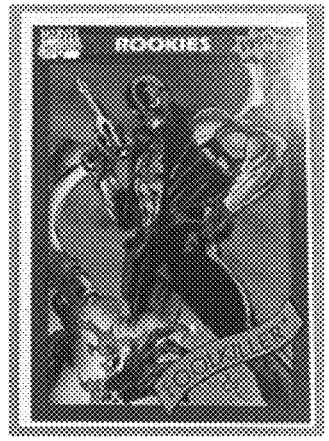
Figure 35C:
Figure 35D:
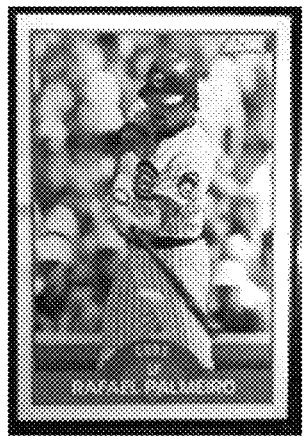
Figure 35E:

The system will let the microcontroller turn all LEDs on and take an initial capture of the card. The initial capture would be distorted by the fisheye effect as shown in FIG. 29A. The system takes the image and fixes the distortion, making the sides of the card straight, which is shown in FIG. 29B. The images have been darkened for demonstration purposes as it is easy to observe the points mapped on the image by the system. The corner algorithm finds all possible points where there is a corner as shown in FIG. 30. Most of the data found in FIG. 30 is irrelevant or unwanted and with the use of the points of the case 311 shown in FIG. 31 irrelevant points are eliminated. FIG. 32 shows the point left after eliminating irrelevant points. According to an embodiment, the exact position of the corners of the case that are used on a device, as shown in FIG. 31, are going to stay consistently in the same position, so instead of finding where the positions of these corners is every single grading cycle, algorithm can also empirically obtain the location of the corners and use these positions as constant variables. Then the algorithm separates the points into quadrants as explained before and it looks for the points furthest away of each of the quadrants. In FIG. 33 it is possible to see these points of the corners of the case 331 and corners of the card 332. The card corners 332 found are used to eliminate unwanted points inside the card. Then the code process is repeated to find the design corners as observed at 341 in FIG. 34. These points found for the card and the design are used to measure the distance of each side of the design to the border of the card. These values are used to calculate percentages and a final centering grade.

Five different cards were graded are shown in FIG. 35A to FIG. 35E, all the cards received a centering grade value within 0.5 points of the control data. Also, all five cards were graded ten consecutive times, and the grade for the centering stayed consistent within 0.5 points of each other.

Figure 36:
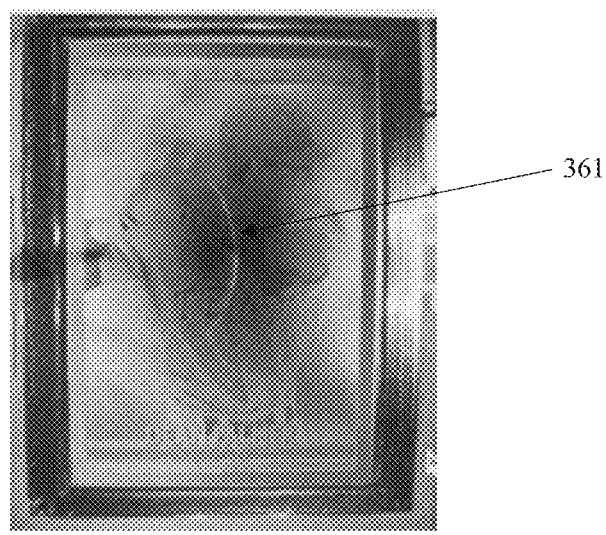
FIG. 36 is a view of the card where the surface analysis module found the scratch according to an embodiment of the disclosure.
Figure 37:
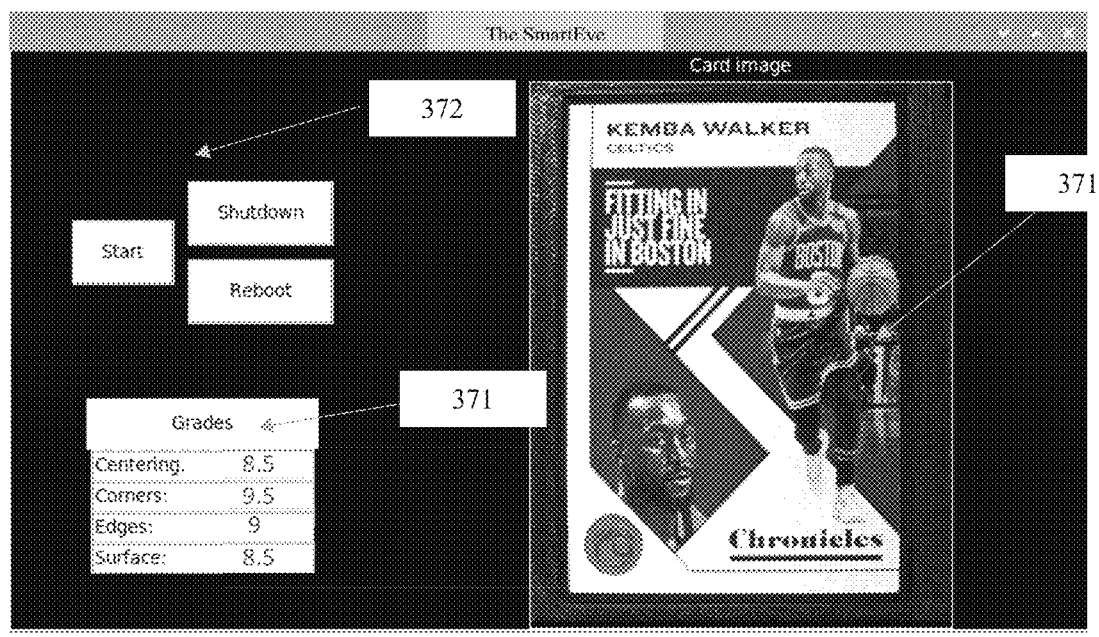
FIG. 37 is a view of the sample card and its grade for each of the grading criteria displayed on the display or graphical user interface according to an embodiment of the disclosure.

Composite image processing routine is used on the eight captures of both surfaces of a card to find any surface defects. FIG. 36 shows the highlighted possible scratches or indentations at 361. The image processing routine was able to find a scratch in the form of a semicircle on the test card by comparing the standard deviation of the card to the initial capture. FIG. 37 shows a screen capture of the GUI for another test card. In the right of the image, the card being graded is seen at 371. On the upper left side there are four buttons provided as described in the interface at 372. Finally, in the lower left side text entries with the results of the grading cycle are displayed as shown at 373. FIG. 38 shows an example annotated grade report generated according to an embodiment comprising the details of the grade value and details for each of the categories of centering, corners, edges, and surface defects along with the overall grade score.

System Test Results

System Test

The system was run through the autonomous full grading cycle while conforming to the specified technical specifications. This test will make sure that the device can operate for an hour continuously and that the grading cycles average a maximum of one minute. This test will also ensure that the device is less than 30 pounds ideally, and less than 50 pounds outright.

Test Procedure: The procedure for this test is relatively straightforward. Different sports cards will be placed into the device and scanned for one hour. One card will not be run through the system each minute, but rather every few minutes to simulate actual usage. Each grading cycle will be timed with a stopwatch, and the timing data will be recorded. The device will also be weighed on a scale.

Test Results: The device ran for much longer than 60 minutes during our system test without any malfunctions or problems. The grading cycles averaged 44.62 seconds, well below the 60 second target. The device weighed 20 pounds on a scale, 33% lighter than the optimal limit of 30 pounds.
Safety Test This test is to make sure that the device is safe. This test will satisfy the requirements that the noise be lower than 70 dB, all electrical components are grounded, and all mechanical components that could cause harm are sufficiently protected.

Test Procedure: The noise portion of this test will be very easy to test. A sound level meter will be used to measure the maximum sound that the device produces. A finger test will be employed to ensure that a person can hold a finger on any resistor or electrical component indefinitely without discomfort. The lighting enclosure will also cover the mechanical components during movement.

Test Results: A phone app was used to measure the sound of the device. The sound of the motors is the only sound produced, and this sound was measured at 20-33 dB. This is well below the maximum limit of 70 dB, which would require hearing protection. All electrical components are grounded to a common ground on the frame, which is connected to the ground on the wall outlet. The lighting enclosure does cover all components that move, so there is no fear of pinching.
Training Test To make sure that a non-professional can operate this device with 30 minutes or less of training, a training test is needed.

Test Procedure: A new person who has not seen the testing machine before is instructed on how to operate the system. If they can operate it on their own with 30 minutes of training, then this test will succeed.

Test Results: A new person was taught how to use the system fully. The process of using the device is listed below.
  1. Flip switch and allow the system to initialize.
  2. Place a card in the reception area.
  3. Press the Start button on the GUI.
  4. Remove the card which is graded, stamped and encapsulated from the extraction area when done.
Repeatability Test Since subjectivity is to be eliminated, the same card must not get radically differing grades when passed through the system.

Test Procedure: The same card will be put through the system four times. The grade for the card must not differ more than 50 points on the 1000-point scale or 0.5 on a 10-point scale. A variance of 5% or a range of 0.01% to 10% variance can be implemented. The scale can as well be varied based on the grade range. For example, 0.1% increments in the higher range and 1% increment in the lower range instead of a fixed variance over all of the grade scale.

Test Results: For a baseball card tested, the centering grade for four runs was a constant 9.0. Other cards were also tested and achieved the same consistent result among runs. The repeatability of the system is tested.

INCORPORATION BY REFERENCE

All references, including granted patents and patent application publications, referred to herein are incorporated herein by reference in their entirety.

U.S. patent Ser. No. 10/459,931 titled "Computerized technical authentication and grading system for collectible objects".

US Publication No. 20050261848A1 titled "System and method for classifying restoration of paper collectibles".

US Publication No. 20150127507A1 titled "Commodity and collectible identification, verification and authentication mobile system and methods of use".

US Publication No. 20190114762A1 titled "Computer-Controlled 3D Analysis Of Collectible Objects".

US Publication No. 20170148032A1 titled "Collectable item condition certification system".

US Publication No. 20070118436A1 titled "Collectible holders having radio frequency identification tags and systems and methods for using the same".

US Publication No. 20070187266A1 titled "Method, apparatus, and system for tracking unique items".

U.S. patent Ser. No. 10/467,502B2 titled "Surface defect detection".

US Publication No. 20200175352A1 titled "Structure defect detection using machine learning algorithms".

Tabernik, D., Šela, S., Skvarč, J. et al. Segmentation-based deep-learning approach for surface-defect detection. *J Intell Manuf* 31, 759-776 (2020). https://doi.org/10.1007/s10845-019-01476-x

What is claimed is:

1. A system, comprising:
   an electromechanical platform for positioning and orienting a collectible to capture a plurality of images by an image capturing device of at least a first side and a second side of the collectible;
   a computer comprising at least one processor, wherein the computer is operable to receive the plurality of images of the collectible;
   at least one processing routine comprising an image processing algorithm for a condition assessment of the collectible applied to at least one image from the plurality of images by at least one processor to obtain a raw data of the condition of the collectible;
   a device for encapsulating the collectible in a tamper proof casing and stamping at least one or more labels on the tamper proof casing, wherein the stamping of the at least one or more labels is at a specified location on the tamper proof casing; and
   wherein the system is operable to be fully autonomous.

2. The system of claim 1, wherein the collectible is at least one or more sport trading cards or non-sport trading cards.

3. The system of claim 1, wherein the electromechanical platform is configured to have at least one degree of rotational freedom to position and orient the collectible relative to the image capturing device.

4. The system of claim 1, wherein the image processing algorithm for the condition assessment of the collectible is a machine learning algorithm aided by artificial intelligence, wherein the machine learning algorithm is operable to identify at least one physical feature of the collectible at least in part by providing a composite image as an input to a multi-layer neural network using deep learning technique.

5. The system of claim 4, wherein the machine learning algorithm of the system is trained using images of trading cards exhibiting examples of different classes of defects including surface defects.

6. The system of claim 1, wherein the electromechanical platform comprises an adaptive casing.

7. The system of claim 1, wherein the first side is a top surface of the collectible, and the second side is a bottom surface of the collectible.

8. The system of claim 6, wherein the adaptive casing is in open position when an image capturing device captures at least a first set of images of the first side of the collectible and rotates about an axis of the collectible to 180 degrees and is in open position when an image capturing device captures at least a second set of images of the second side of the collectible.

9. The system of claim 1, wherein the condition assessment of the collectible is based on collecting metrics for centering, corners, edges from an image of the collectible and identifying a possible area on surface of the collectible where a physical damage may be present, wherein the physical damage comprises an analysis for bends, tears, stains, scratches, discolorations, cuts, color fading, alterations, re-coloring, bleaching of image and/or card, chips, dents, added color to fill in areas of defect, printing errors, effects of bleaching, stain removal, addition of material or other material and image removal for a purpose of altering a width of borders of the collectible to re-center the collectible.

10. The system of claim 1, wherein the raw data of the condition is used towards computing a grade for the collectible to a grade scale.

11. The system of claim 10, wherein the grade computed from the raw data of the condition is further adjusted with overall grade adjustment rules which are autonomously obtained by algorithms from planned and known cases.

12. The system of claim 1, wherein the raw data of the condition is used towards generating a detailed annotated report comprising a detailed image report and relevant information used in determining a grade of the collectible.

13. The system of claim 1, wherein the raw data of the condition of the collectible is provided to a professional grader to arrive at a final grade.

14. The system of claim 10, wherein the grade scale can be any predefined scale including a 1000-point scale or a 10-point scale with a grade scale tolerance.

15. The system of claim 14, wherein the grade scale tolerance can be in a range of 0.01% to 10% and can be varied within the grade scale.

16. The system of claim 1, wherein the at least one or more labels comprises unique identification number including serial number, Quick Response code, and barcode.

17. The system of claim 1, wherein the raw data of the condition of the collectible is stored in a database either locally or on a cloud.

18. The system of claim 1, wherein the system is portable.

* * * * *